(12) United States Patent
Agrawal et al.

(10) Patent No.: US 6,570,926 B1
(45) Date of Patent: May 27, 2003

(54) ACTIVE TECHNIQUES FOR VIDEO TRANSMISSION AND PLAYBACK

(75) Inventors: Prathima Agrawal, New Providence, NJ (US); Jyh-Cheng Chen, Flanders, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/420,097

(22) Filed: Oct. 18, 1999

Related U.S. Application Data

(60) Provisional application No. 60/121,532, filed on Feb. 25, 1999.

(51) Int. Cl.[7] .................................................. H04B 1/66
(52) U.S. Cl. ............................ 375/240.27; 375/240.26; 375/240.28; 375/240.25; 370/474; 370/522; 382/253; 382/239
(58) Field of Search ............................... 348/416.1, 409, 348/699, 402.1, 465; 375/240.27, 240.25, 240.28, 240.26; 370/474, 522; 382/253, 239

(56) References Cited

U.S. PATENT DOCUMENTS

| | | | | |
|---|---|---|---|---|
| 5,418,568 A | * | 5/1995 | Keith | 348/390 |
| 5,502,497 A | * | 3/1996 | Yamaashi et al. | 348/473 |
| 5,574,505 A | * | 11/1996 | Lyons et al. | 348/426 |
| 5,598,415 A | * | 1/1997 | Nuber et al. | 348/465 |
| 5,623,262 A | * | 4/1997 | Normile et al. | 341/67 |
| 6,008,852 A | * | 12/1999 | Nakaya | 348/416 |

OTHER PUBLICATIONS

Microsoft, Windows Users Guide, 1990–1992, Monotype Corp. PLC, 3.1, 452–453.*

* cited by examiner

Primary Examiner—Chris Kelley
Assistant Examiner—Shawn S. An
(74) Attorney, Agent, or Firm—Joseph Giordano; James W. Falk

(57) ABSTRACT

Encoding a real-time and non-real-time video stream, encapsulating the encoded video stream along with the decoding software corresponding to the encoding program into active packets at the Application and Services layer, and transmitting active the packets to the receiving terminal, which then supplies the receiver with the necessary decoding software to play any type of encoded video stream without having the associated decoding software pre-loaded.

17 Claims, 20 Drawing Sheets

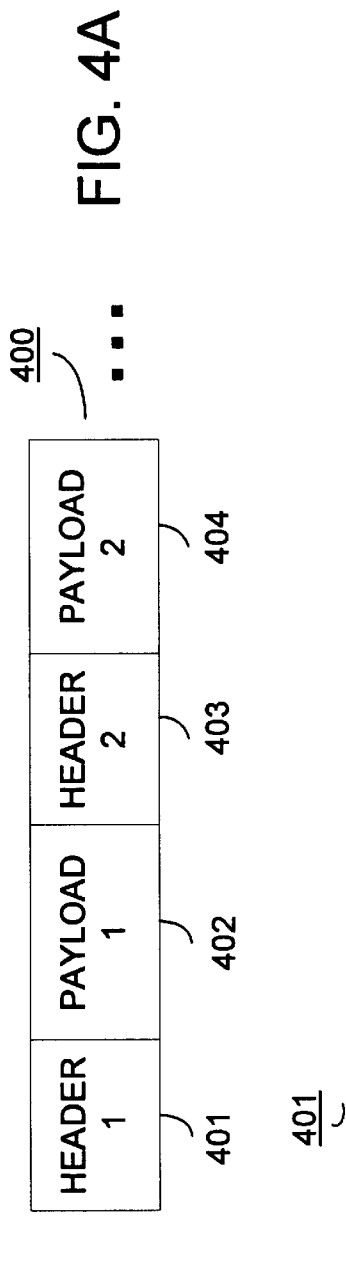

| DATA MEMORY | | 745 |
|---|---|---|
| DPID | DATA | |
| 2111 | '01000101111 ...' | |
| 2113 | '11010001110 ...' | |
| ... | ... | |

| PROGRAM MEMORY | | | 750 |
|---|---|---|---|
| PPID | DPID | PROGRAM | |
| 2112 | 2111 | BINARY OF DECODING ALGORITHM FOR DPID 2111 | |
| 2114 | 2113 | FIRST PART BINARY DECODING ALGORITM FOR DPID 2113 | |
| 2114 | 2113 | SECOND PART OF BINARY DECODING ALGORITM FOR DPID 2113 | |
| ... | ... | ... | |

```
┌─────────────────────────────────────────────────┐
│   ASSIGN DATA PACKET IDENTIFIER (DPID)          │
│  AND PROGRAM IDENTIFIER (PPID), IF NECESSARY    │
└─────────────────────────────────────────────────┘
                      │
                      └─1310
                      ▼
┌─────────────────────────────────────────────────┐
│        ASSOCIATE DPID WITH DATA PACKET          │
│         AND PPID WITH PROGRAM PACKET            │
└─────────────────────────────────────────────────┘
                      │
                      └─1320
                      ▼
┌─────────────────────────────────────────────────┐
│   ENTER DPID INTO PROGRAM PACKET HEADER OF      │
│          ASSOCIATED PROGRAM PACKET              │
└─────────────────────────────────────────────────┘
                      │
                      └─1330
                      ▼
┌─────────────────────────────────────────────────┐
│ GENERATE ACTIVE PACKET HEADER FOR CORRESPONDING │
│        DATA PACKET AND PROGRAM PACKET           │
└─────────────────────────────────────────────────┘
                      │
                      └─1340
                      ▼
┌─────────────────────────────────────────────────┐
│   FORM PACKET FROM ACTIVE PACKET HEADER, DATA   │
│         PACKET, AND PROGRAM PACKET              │
└─────────────────────────────────────────────────┘
                      │
                      └─1350
```

FIG. 13

ACTIVE TECHNIQUES FOR VIDEO TRANSMISSION AND PLAYBACK

CROSS-REFERENCE TO RELATED APPLICATION

This application is a non-provisional application of provisional application Serial No. 60/121,532 filed Feb. 25, 1999.

BACKGROUND OF THE DISCLOSURE

1. Field of the Invention

This invention relates generally to video communications, and, more particularly, to methodologies and concomitant circuitry for dynamically injecting video coding software into a transmitted video stream so that receivers are capable of playing video encoded in any format.

2. Description of the Background

Currently there are many different types of video coding standards which can only be utilized for video playback at a receiver if the receiver has the correct software pre-loaded. As the number of different encoding techniques grows and existing video encoding software is updated, the receiver must load all the new and updated software in order to play current video streams.

Representative of the conventional arrangement to transmit video frames via packets through a packet network is the high-level depiction of video system 100 shown in FIG. 1. Each video frame produced by a standard source (not shown), as exemplified by frame 110 serving as the input to transmitter 101, is compressed by encoder 120 with reference to an encoding program stored in program memory 125, and the encoded output appearing on lead 121 is formatted into packets 131 by data packetizer 130. Transmitter processor 135 controls the interactions of encoder 120 with program memory 125, and also provides the necessary control information so as to form packets 131. In turn, packets 131 are transmitted via packet network 140 as propagating packets 132 which are detected by receiver 102, where the packets are processed by data extractor 150 to produce, on lead 151, the received counterpart of compressed output 121 in transmitter 101. The resulting data stream on lead 151 is decompressed by decoder 160 to produce received frame 111, a reproduced version of original frame 110.

In order to reproduce frame 111, it is necessary for decoder 160 to have available decoding software which corresponds to the encoding software of encoder 120. Conventionally this is accomplished by the prior loading and storing of the corresponding decoding software in decoder 160 so as to display the video stream. Unfortunately from the point of view of loading and storage, there are many different video coding standards, including MPEG-1, MPEG-2, MPEG-4, MPEG-7, JPEG, H.261, and H.263. The standards also keep evolving. Thus, it is sometimes the case that receiver 102 receives a video stream 132 which cannot be played back because decoder 160 lacks suitable decoding software, either because decoder 160 has not been loaded with the commensurate software or the decoder is not compatible with the older or newer version of compressed video. Currently users of system 100 are responsible for installing each unique piece of software that may be required in decoder 160 in order to decode a particular video stream.

The subject matter of the present invention relates to: (a) encapsulating the appropriate video decoding software, including the encoding algorithms, via transmitter 101; (b) bundling the decoding software with the actual video packet streams; and (c) transmitting the encoded video along with specific decoding instructions to receiver 102. This provides any properly equipped receiving terminal with the ability to play any type of encoded video stream without having the associated decoding software pre-loaded, thus creating a highly flexible and dynamic video transmission environment. The methodology and concomitant circuitry of the present inventive subject matter engenders what is referred to as "active techniques" for video.

Recently, the notion of "active networking" has been introduced; active networking is intended to effect a significant change on the historical network paradigm, namely, a change from a passive carrier of analog/digital signals to a more general computational ability associated with network components, and has especially been applied to switches and/or routers used to provide telecommunications services. However, such efforts to this point in time have been devoted more to outlining the benefits that such a paradigm could achieve, without elucidating specifics of such an approach except in a few special cases.

For example, the paper entitled "On Active Networking and Congestion" as authored by Bhattacharjee, Calvert, and Zegura (BCZ) in January, 1996 and published as Georgia Institute of Technology Technical report GIT-CC-96/02, focuses on applying active networking concepts to handling network congestion. In BCZ, the model of what happens when a packet arrives at a node (used interchangeably with switch or router) is as follows—for purposes of discussion, a packet is composed of a header part and a payload part:

(1) The output destination port for the packet is computed as usual.

(2) If a packet contains a valid Active Processing Function Identifier (ACPI), it is sent to an active processor and processing continues; otherwise, it is transmitted as usual.

(3) The function specified in the ACPI is computed, using the packet's association descriptor and user data as inputs.

(4) If the result of the function is transformed data (e.g., reduced length), the packet's network-level header and ACPI are recomputed as necessary; the node's state is updated as required by the specified function.

(5) The (possibly modified) packet is transmitted to its next-hop node.

It is extremely important to reiterate that the above procedure requires an Active Processing Function Identifier (ACPI) to differentiate between conventional processing and additional, that is, active processing. As BCZ further point out, the obvious place to put the ACPI is in the same header used to switch the packet. However, BCZ concludes that such an approach is unacceptable for at least two reasons. First, the approach does not work for ATM or any other technology where the switched unit is too small to accommodate additional overhead of the ACPI. And second, the approach is not backward-compatible, requiring that all network protocols become "active-aware". BCZ proposes that an alternative to placing the ACPI in the network header itself is to define a "generic" location for the ACPI function, sufficiently high in the protocol stack that the additional processing overhead is not prohibitive, but sufficiently low in the protocol stack to allow its location by switching nodes without too much knowledge of higher-level protocols. Thus, BCZ immediately rules out the use of the packet itself for differentiating between conventional and active processing. However, use of the packet (either the header, payload, or both) overcomes what BCZ deems to be unacceptable, that is, use of the packet itself eliminates additional packet overhead, and network protocols need not be "active-aware".

Moreover, in the BCZ approach, there is no program portion in the packet. Programs are embedded into the node. There is only a set of predefined computations which can be performed in the node. A node which has the computational power is called an active processor (AP). Header information in each packet specifies which computation is to be performed on it. For example, for MPEG packets, the fields in the header indicate the priority of particular packets (for example, I, P, and B frames, as further discussed below). This priority is used in the AP to decide which packet should be dropped to avoid congestion.

Consequently, the prior art is devoid of teachings or suggestions relating to: encapsulating the appropriate video decoding algorithms and software, bundling them with the actual video streams, and transmitting the encoded video along with specific decoding instructions to the receiving terminal, which then allows properly equipped receiving terminals the ability to play any type of encoded video stream without having the associated decoding software pre-loaded, thus creating a highly flexible and dynamic video transmission environment.

SUMMARY OF THE INVENTION

Shortcomings and limitations of the prior art are obviated, in accordance with the present invention, by a methodology and concomitant circuitry wherein, generally, the programming code to decode encoded video is bundled with the encoded video in the same propagation stream so that the appropriate decoding program is readily available without the need to configure the receiver beforehand.

Broadly, in accordance with one method aspect of the present invention, a method for transceiving a real-time video frame includes the following procedure: (a) encoding the data with an encoding program to produce encoded data; (b) propagating the encoded data and a decoding program corresponding to the encoding program; and (c) detecting the decoding program and the encoded data.

Broadly, in accordance with another method aspect of the present invention, a method for transceiving a real-time frame includes the following procedure: (a) encoding the video frame with an encoding program to produce an encoded frame; (b) propagating over a path an active packet composed of the encoded frame and its associated decoding program; and (c) detecting the decoding program and the encoded frame in the active packet.

BRIEF DESCRIPTION OF THE DRAWINGS

The teachings of the present invention can be readily understood by considering the following detailed description in conjunction with the accompanying drawings, in which:

FIGS. 4A, 4B, and 4C depict the composition of MPEG-2 packets, at high level and in detail, including a payload conveying a Program Association Table;

FIG. 11 depicts representative contents of the data memory and program memory of the receiver of FIG. 7 in accordance with the present invention;

FIG. 13 is a flow diagram for assigning and associating the data packet identifier, and program packet identifier, if necessary, in an active packet;

To facilitate understanding, identical reference numerals have been used, where possible, to designate identical elements that are common to the figures.

DETAILED DESCRIPTION

To fully appreciate the import of the signal processing system of the present invention, as well as to gain an appreciation for the underlying operational principles of the present invention, it is instructive to first present, in overview fashion, a high-level description of a conventional system for transmitting a sequence of video frames. This overview also serves to introduce terminology so as to facilitate the more detailed description of an illustrative embodiment in accordance with the present invention. Following this overview, a description of the illustrative embodiment is then elucidated.

Overview of a Conventional Video System

Video transmission is typically broadband in nature. For example, compressed High Definition Television (HDTV) requires a bandwidth between 20-to-40 Mbps. Compression algorithms at the source reduce the required bandwidth for the transmission medium and yet maintain reasonable video quality at the receiver.

Figure 1:
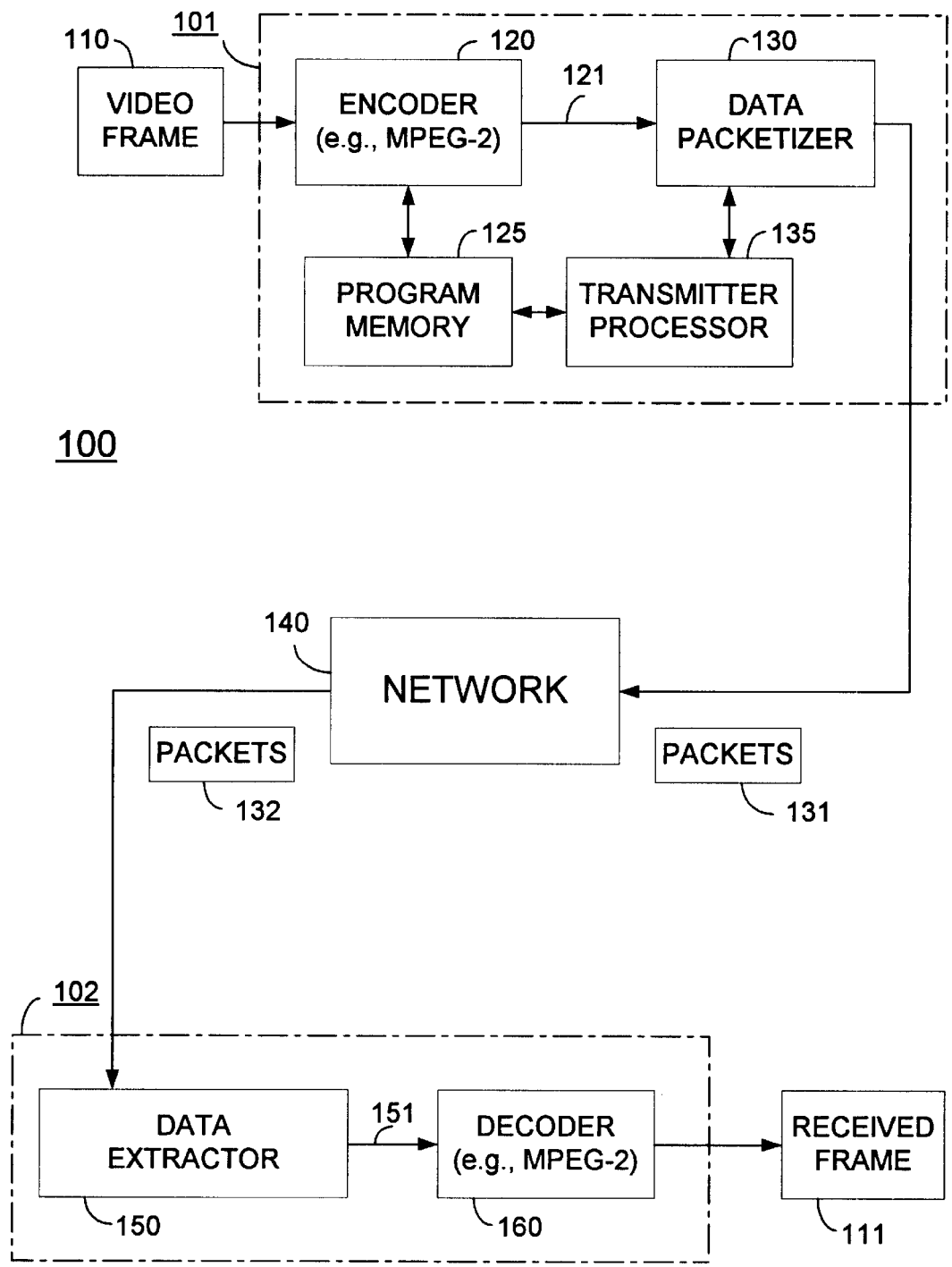
FIG. 1 depicts a conventional system for propagating packets representative of video frame information.
Figure 2:
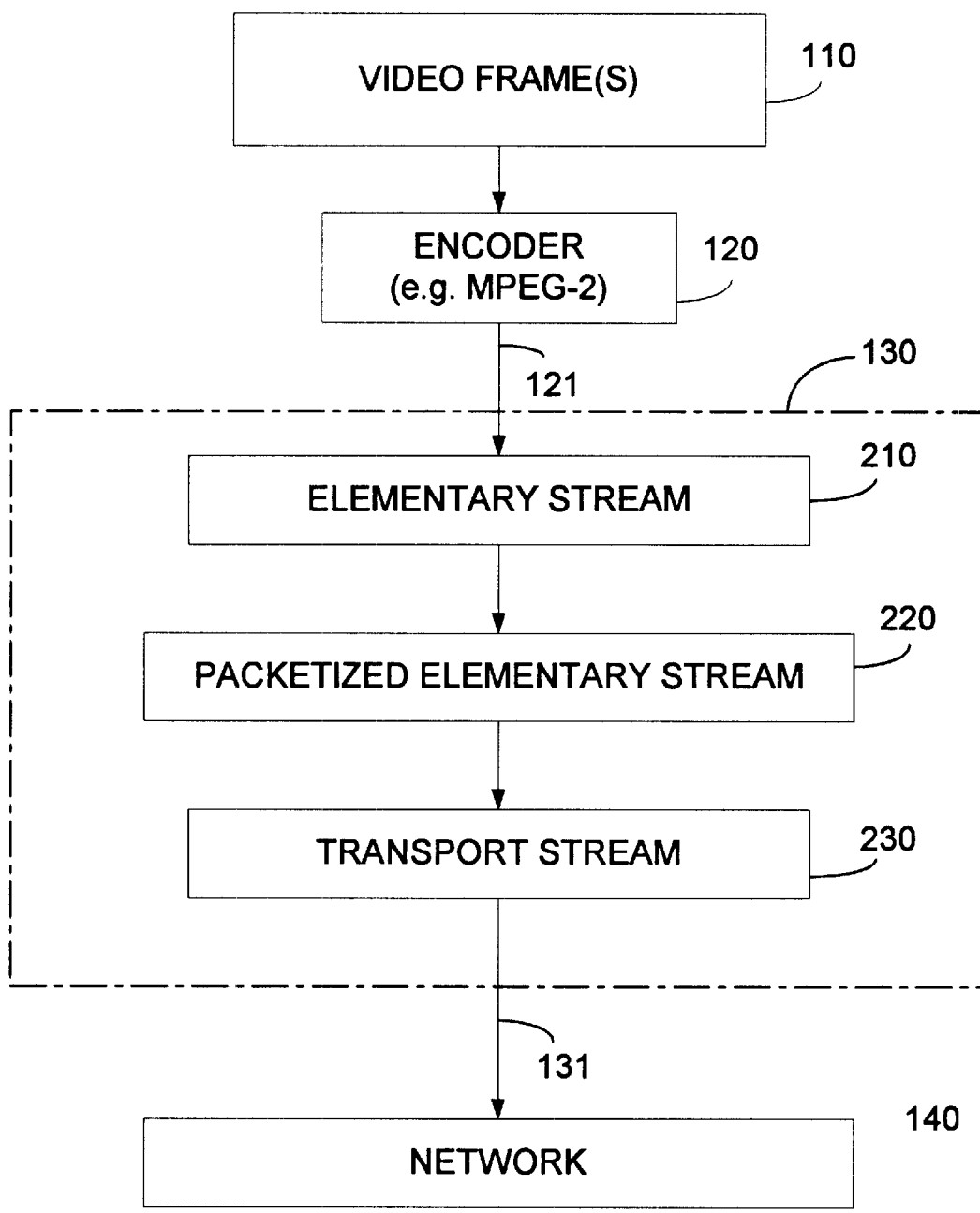
FIG. 2 depicts the hierarchy of the various streams used in the MPEG-2 standard.

The pictorial representation of FIG. 2 illustrates the protocols levels that data packetizer 130 of FIG. 1 generate so as to transport a digital video frame from the source to the receiver for MPEG-2, which standard is taken as representative of modern techniques for transporting video signals. In particular, each frame 110 received by encoder 120 is transformed into a compressed video digital representation of the frame, which is referred to as the "encoded video" of the frame and appears on lead 121. Data packetizer 130 generally includes elements, corresponding to the MPEG-2 standard, for generating: (a) an elementary stream (ES) from the encoded video (element 210); (b) a packetized elementary stream (PES) from the elementary stream (element 220); and (c) a transport stream from one or more PESs (element 230) to derive the MPEG-2 packets 131 ready for transport over network 140. The encoded video is processed by element 210 by adding header information that is used to reconstruct the frames at the receiving end. However, no timing or system data is present at this point in the packaging of the encoded video. Next, element 220 adds timing information (e.g., the Presentation Time Stamp (PTS) and the Decode Time Stamp (DTS), as discussed below in more detail) so as to inform the receiver as to the time to decode as well as the order to decode. Finally, element 230 adds system information as well as a clock reference (e.g., the Program Clock Reference (PCR)) for timing information. Thus, in a generic sense, data packetizer 130 transforms the encoded video to the transport stream which contains all necessary information to re-transform the transport stream to derive the encoded video.

Encoding of Video

Numerous algorithms for video encoding have been devised to effect compression at the source. The video source which produces a sequence of frames, with frame 110 in FIG. 1 being representative of one such frame, generates a specified number of frames per second; for example, a NTSC-compatible source generates 30 frames per second (fps), and a video telephony source generates 10 fps. Generally, there are two coding techniques for compression of video information, namely, "intraframe" and "interframe" coding. Intraframe coding (an I-frame as used below) exploits the spatial redundancy within a frame, while interframe coding exploits temporal redundancy between frames. An I-frame contains full picture information. In the spatial domain, each video frame is divided into a "block", for example, of 8×8 pixels. The Discrete Cosine Transform (DCT), for example, is applied to these blocks, and the DCT coefficients are quantized to a user-defined level. Four blocks are grouped to create a "macroblock" (MB). A number of row-wise adjacent MBs are grouped to create a "slice". A slice is the basic transmission and resynchronization unit for the video stream.

Figure 3A:
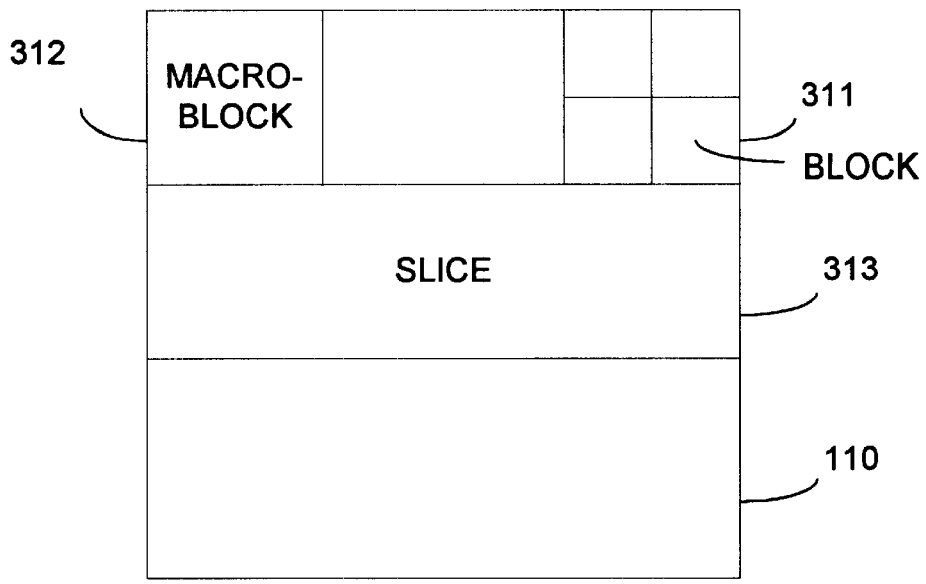
FIGS. 3A, 3B, and 3C depict, respectively: the components of a frame; the spatial and temporal encoding, both for the MPEG-2 standard; and the layer structure for the MPEG-2 standard.
Figure 3B:
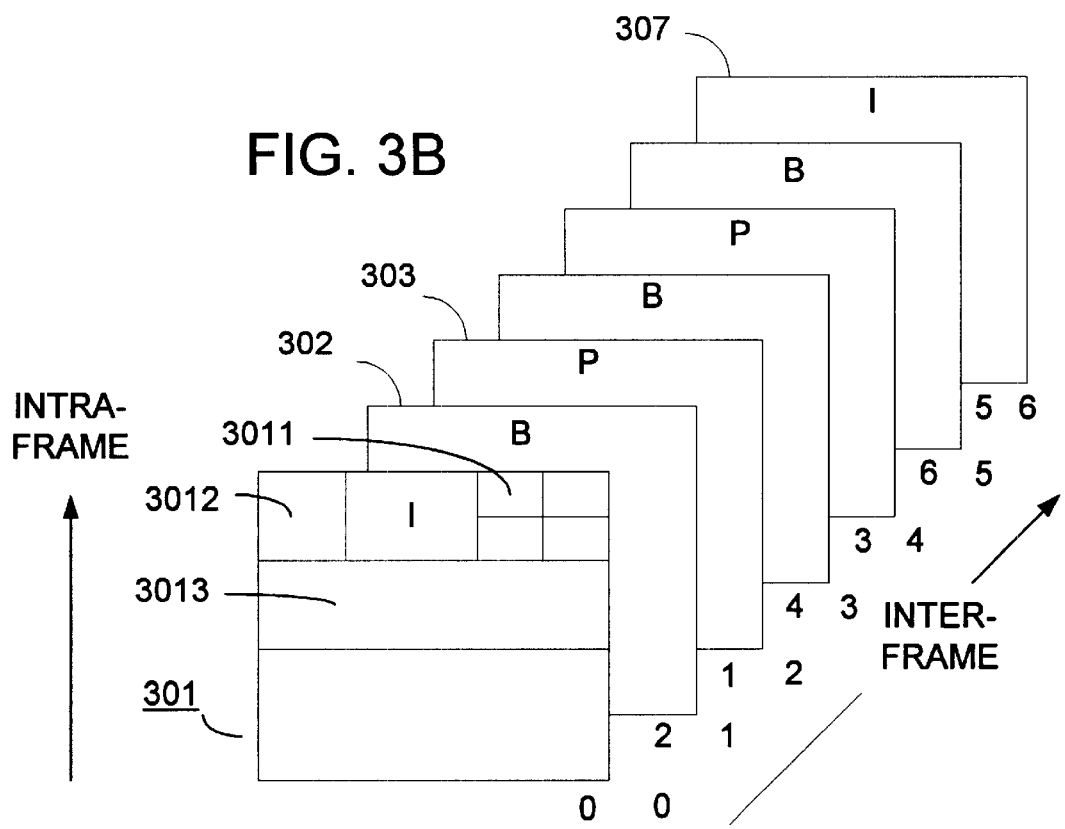
Figure 3C:
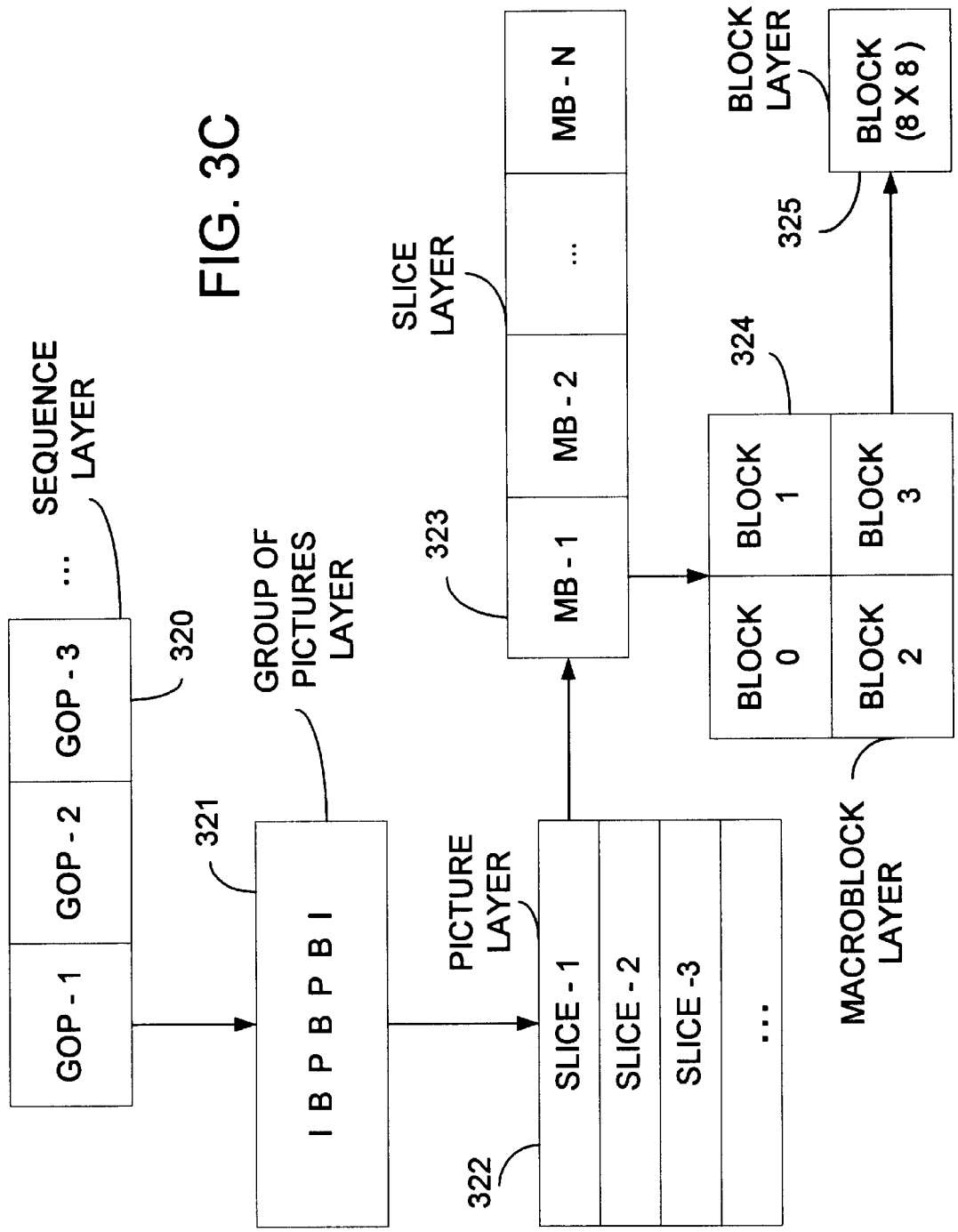

In the temporal domain, there are three frames for MPEG-2: intra (I), predictive (P), and bidirectional (B) frames. The coding for an I-frame is based on spatial redundancy as described above. The purpose of the P-frame is to reduce temporal redundancy by motion estimation. This is accomplished by searching for a best-match MB from the previous I or P frame, for every MB in the current frame. The "motion compensated predictive error", the difference between this MB and the best-match MB. becomes part of the information transmitted to the receiving end. For a B frame, the best-match MB search from both the previous and next I or P frame is effected. Both forward prediction and backward prediction can be used as the motion compensated prediction. Since the B frame needs the information from the previous and the next I or P frames, the processing order is not identical to the natural sequence of the video frame. FIG. 3A summarizes the foregoing discussion with respect to the arrangement of blocks (311), macroblocks (312), and slices (313) for the given video frame 110. FIG. 3B summarizes I, P, and B frames. In FIG. 3B, frame 301 is shown as being composed of block 3011, macroblock 3012, and slice 3013. Frames 302–307 are, respectively, presumed to be B, P, B, P, B, and I frames. Whereas the displaying order is the natural order of the frames, that is, the sequential order 0, 1, 2, ... 6 (that is, the Presentation Time Stamp), FIG. 3B also highlights the fact that the processing order (that is, the Decode Time Stamp) for encoding and decoding of the frames, namely, 0, 2, 1, 4, 3, 6, and 5, is different than the displaying order at the receiver. Finally, video sequences are sent as a group of pictures (GOP) which contains several frames; FIG. 3B shows how the set of seven frames constitute a GOP. FIG. 3C summarizes the various layers utilized by the MPEG-2 standard so as to convert a frame into data suitably arranged for transmission as packets 131 of FIG. 1. In particular, each packet contains high-level information and data representative of sequence layer 320 (which is oftentimes referred to as the packet "payload", as discussed in more detail shortly). In turn, sequence layer 320 is composed of Group of Pictures layer 321; layer 321 is composed of Picture/Frame layer 322; layer 322 is composed of Slice layer 323; layer 323 is composed of Macroblock layer 324; and, finally, layer 324 is composed of Block layer 325.

This completes the high-level view of MPEG-2 encoding. Other standards are now briefly discussed, and compared to MPEG-2 where appropriate. The JPEG standard used to encode "still" images can be used for video systems by treating each frame as a still image. The coding scheme for each frame in JPEG is similar to intraframe coding of MPEG-2. The H.261 standard was developed for videophone and video conferencing and is similar to MPEG-2 but only has I and P frames. MPEG-1 also defines I, P, and B frames, and the coding algorithms are similar. MPEG-2, however, has some enhanced features, such as interlaced video manipulation, scaleability, compatibility, error resilience, and so forth. Like MPEG-2, the H.263 standard is a hybrid of interframe prediction to reduce the temporal redundancy and intraframe coding. However, additional frame modes are defined for coding.

Packetizing of the Compressed Video

The foregoing portion of this overview discussed the coding aspects of the various standards at the source, that is, how the video is compressed to a low enough bit rate so that the video can make economic use of the available transmission bandwidth, as well as the packetizing aspects of device 130 at high-level.

The next part of the overview discusses the creation of the transport stream encapsulating the encoded video output of the encoder, as alluded to in FIG. 2, again for the MPEG-2 standard as being representative of the encapsulating aspects of the other coding standards. In particular, it is necessary to format the compressed video into packets at the source which conform to the MPEG-2 standard for eventual propagation and ultimate detection of the full video in the receiver. Data packetizer 130 of FIG. 1 accomplishes the generation of packets 131 conforming to, as exemplary, the MPEG-2 standard. The description follows the approach of first describing the contents of a MPEG-2 packet, followed by a description how the sequence of packets is transformed to produce the transport stream, so that the connection between the encoded video and MPEG-2 packets composing a transport stream is fully elucidated.

With reference to FIG. 4A, stream 400 of MPEG-2 packets is depicted wherein each packet further comprises a header/payload pair, namely, header 401 and its accompanying payload 402, header 403 and its accompanying payload 404, and so forth. Header 401 is generally four-bytes long, and payload 402 is 184-bytes. Stream 400 is emitted by data packetizer 130 of FIG. 1 and, in the terminology of MPEG-2, is a Transport Stream.

As further shown in FIG. 4B, each header contains at least eight fields; in FIG. 4B an illustrative value, in decimal, for each field is shown below its name, and below that value is the bit-length of the field. Of particular importance for the present invention, as discussed in detail later, is PID (Packet Identifier) field 411. In addition, the payload is composed of components of the compressed video (or in other applications, audio, data, and teletext/closed captioning), as well as referencing information, as arranged according to the layered structure of FIG. 3C.

In FIG. 4C, payload 402 is shown as providing Program Association Table (PAT), which is the payload associated with PID=0 (hereafter, PID 0) and which is composed of entries identified by reference numerals 422, 423, 424, . . . In particular, PAT 402 lists information such as: PID 16 is associated with Program 0 (reference numeral 422), PID 110 is associated with Program 1 (reference numeral 423), PID 210 is associated with Program 2 (reference numeral 424), and so forth. In MPEG-2 terminology, a 'Program' is a collection of streams within a common timebase, which certainly pertains to the sequence of video frames in accordance with the present invention. (Note that the definition of Program is broader than that used in standard TV broadcasting wherein a program is a collection of streams not only with a common timebase, but also with a common start and end time. The MPEG-2 definition subsumes the broadcast definition).

Figure 5:
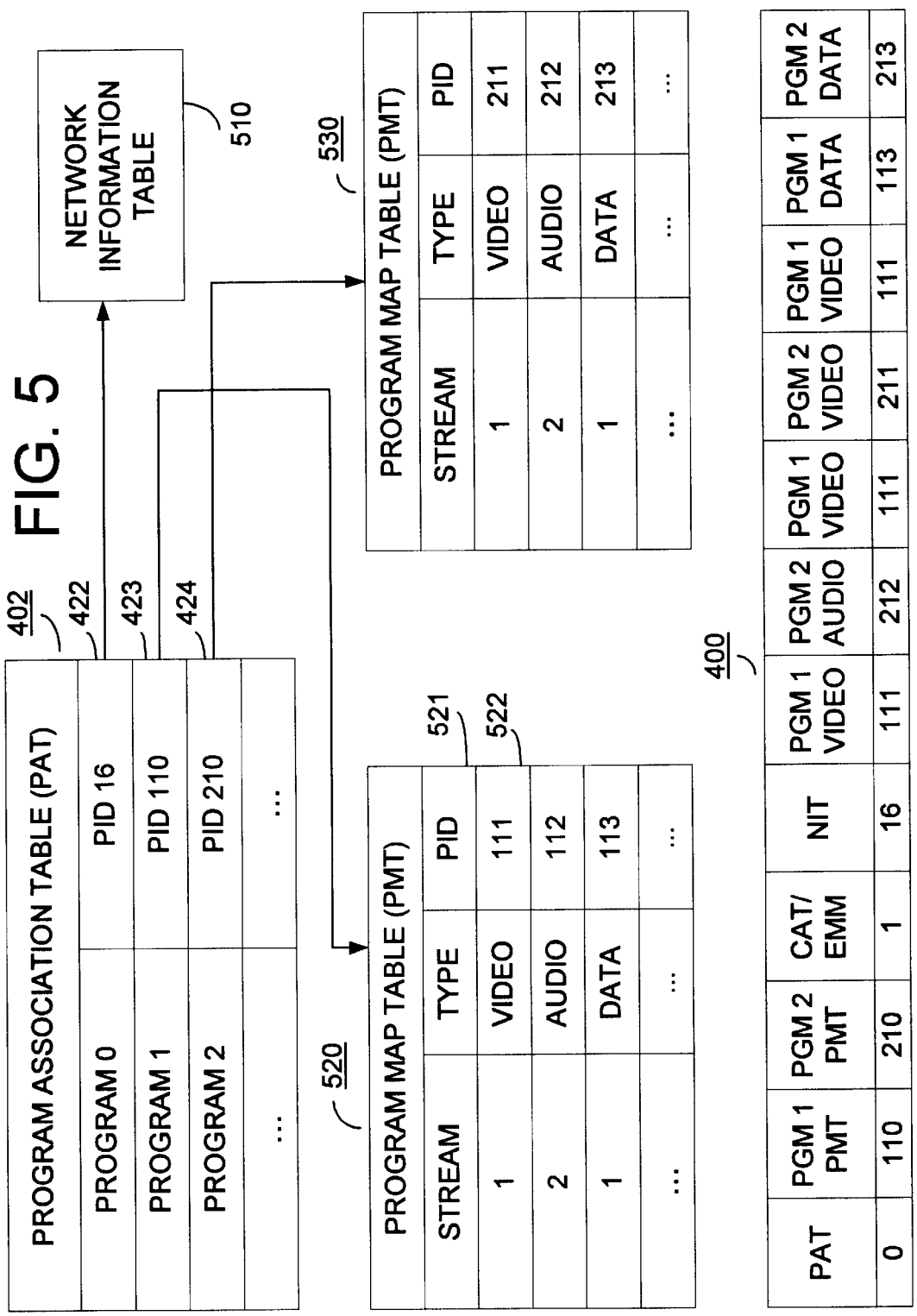
FIG. 5 depicts a MPEG-2 Transport Stream and the relation of the packets in the Transport Stream to the Program Association Table, the Program Map Table, and the Network Information Table.

A more detailed view of Transport Stream 400 is shown in FIG. 5 at the bottom wherein Stream 400 has combined the packets with the following PID's into a single stream: 0, 10, 210, 1, 16, 111, 212, 111, 211, 111, 113, 213, . . . The manner of interleaving these individual packets is covered in the sequel.

A PID 1 packet, by definition in the MPEG-2 standard, contains a Conditional Access Table (CAT), which includes scrambling information as well as an Entitlement Management Message (EMM) that labels each program as to its accessibility by user's equipment. A PID 16 packet, by definition, always has a payload of listing the Network Information Table (NIT) of the originating system's name, location, and similar identifying information. Again, a PID 0 packet provides the Program Association Table.

Transport Stream 400 commences propagation with a packet having PID 0. As shown in FIG. 4C, and as repeated in FIG. 5, the PID 0 packet transmits PAT 402. The further breakdown of the PAT is shown in FIG. 5, wherein PID 16 is linked to NIT 510, PID 110 is linked to Program Map Table (PMT) 520, and PID 210 is linked to PMT 530. PMT's 520 and 530 appear as the payloads in the two packets following the initiating PID 0 packet. A PMT provides more detailed referencing information to further define the mapping between the encoded video stream and the actual packets prepared for transmission, and is used at the receiving end to properly decode the Transport Stream.

PMT 520 lists, as identified by row 521, the Stream Identifier, the Type of signal (e.g., video, audio, data), and a PID assigned to that type by the source. In particular, as depicted by row 522, a packet associated with Stream 1 of Program 1 is of type 'Video", and the packet containing this video has PID 111. Also, the packet associated with Stream 1 of type 'Data" has PID 113. Moreover, PMT 520 exemplifies that another Stream 2, of type 'Audio" having PID 112, has been combined with Stream 1. With reference to Transport Stream 400, it is seen that PID 111 packets appear in the sixth, eighth, and tenth time slots of Stream 400. Also, a PID 113 packet appears in the eleventh time slot.

PMT 530 is arranged similarly to PMT 520, and it is seen that, for example, PID 212 associated with Stream 2 of Program 2, of type 'Audio", appears in the seventh time slot of Transport Stream 400.

By way of reiteration, the function of encoder 120 may be aptly described as a process of applying an encoding algorithm to a sequence of incoming video frames, the algorithm typically being effected by software resident program memory 125, to produce a digital representation of the sequence of video frames, this digital representation be called the encoded video. In addition, the function of data packetizer 130 may be aptly described as a process of appending information to the encoded video to produce a series of packets, conforming to a standard, prepared for transmission over an intervening packet network. Elements 120, 125 and 130 operate under control of transmitter processor 135.

Propagation of Transport Stream over the Internet

Figure 6:
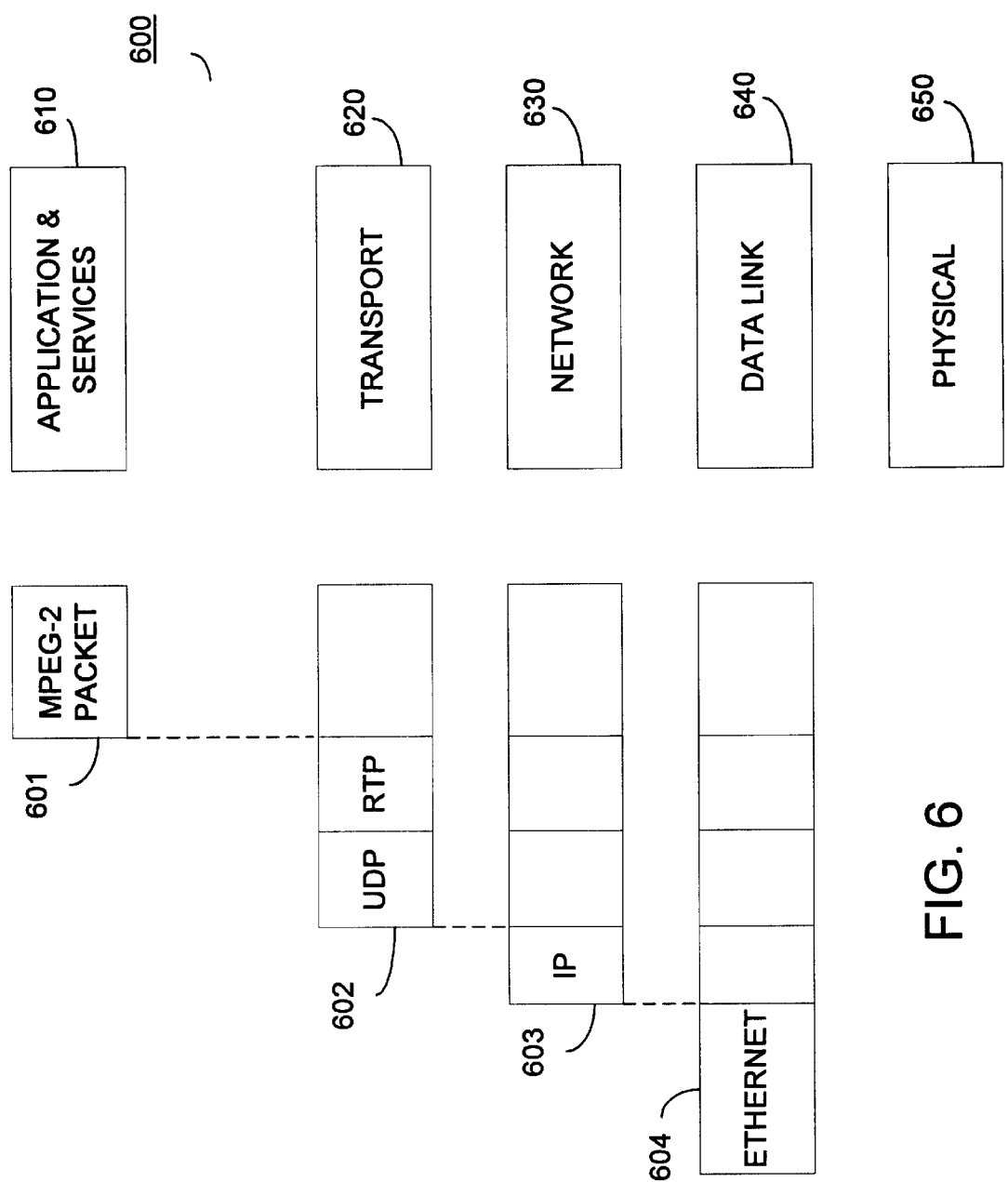
FIG. 6 illustrates an example of a conventional protocol stack for encapsulating packets over the Internet.

The pictorial representation of FIG. 6 illustrates an example of the conventional manner for transmitting an encoded video stream, for which MPEG-2 is taken as representative of other techniques, over the Internet using "protocol stack" 600. The stream handled by the MPEG-2 standard is packet 601 of FIG. 6. Starting at the top and working down in stack 600, "Applications & Services" level 610 produces the encoded video stream, namely, packet 400. "Transport" layer 620 encapsulates each packet in the MPEG-2 stream by appending headers, which are conventionally the RTP and UDP headers 602; this layer effects, for example, end-to-end delivery, connection management, and flow control. "Network" layer 630 further encapsulates the result of layer 620 by appending the IP header 603; this layer effects, for example, routing or rerouting. "Data Link" layer 640 accomplishes error control and access control and further encapsulates the result of layer 630 by appending an Ethernet header 604 for instance. "Physical" layer 650 engenders the actual transmission at the bit-level. In accordance with the present invention, an "active activation" aspect of the "Application & Services' layer of the protocol stack will be treated explicitly, as described in the sequel.

Decoding of Video

The purpose of data extractor 150 of FIG. 1 is that of ultimately recovering the blocks in Block layer 325 of FIG. 3C so that these blocks, being representative of the sequence of video frames, may be decompressed by decoder 160. To accomplish this, a number of intermediate steps are required, namely: (1) with reference to FIG. 6, removal of the various "stack" headers such as the Ethernet, IP, UDP, and RTP headers; (2) with reference to FIG. 5, the identification of the video stream portions (e.g., PID 111) of the transport stream 400; (3) with reference to FIG. 3C, processing the hierarchical layer structure to obtain each block 325 by decomposing hierarchy starting with the sequence layer 320 and working down to the macroblock layer 324; and, (4) recovering the Program Clock Reference, Presentation Time Stamp, and Decode Time Stamp to re-sequence the frames in the correct position according to the reference clock.

Illustrative Embodiment in Accordance with the Present Invention

The method of the present inventive subject matter leverages active networking techniques by employing so-called "active packets" to carry decoding software representative of the code necessary to reconstruct the video frames of the associated compressed video data transport stream.

1.) Real-time Video

Figure 7:
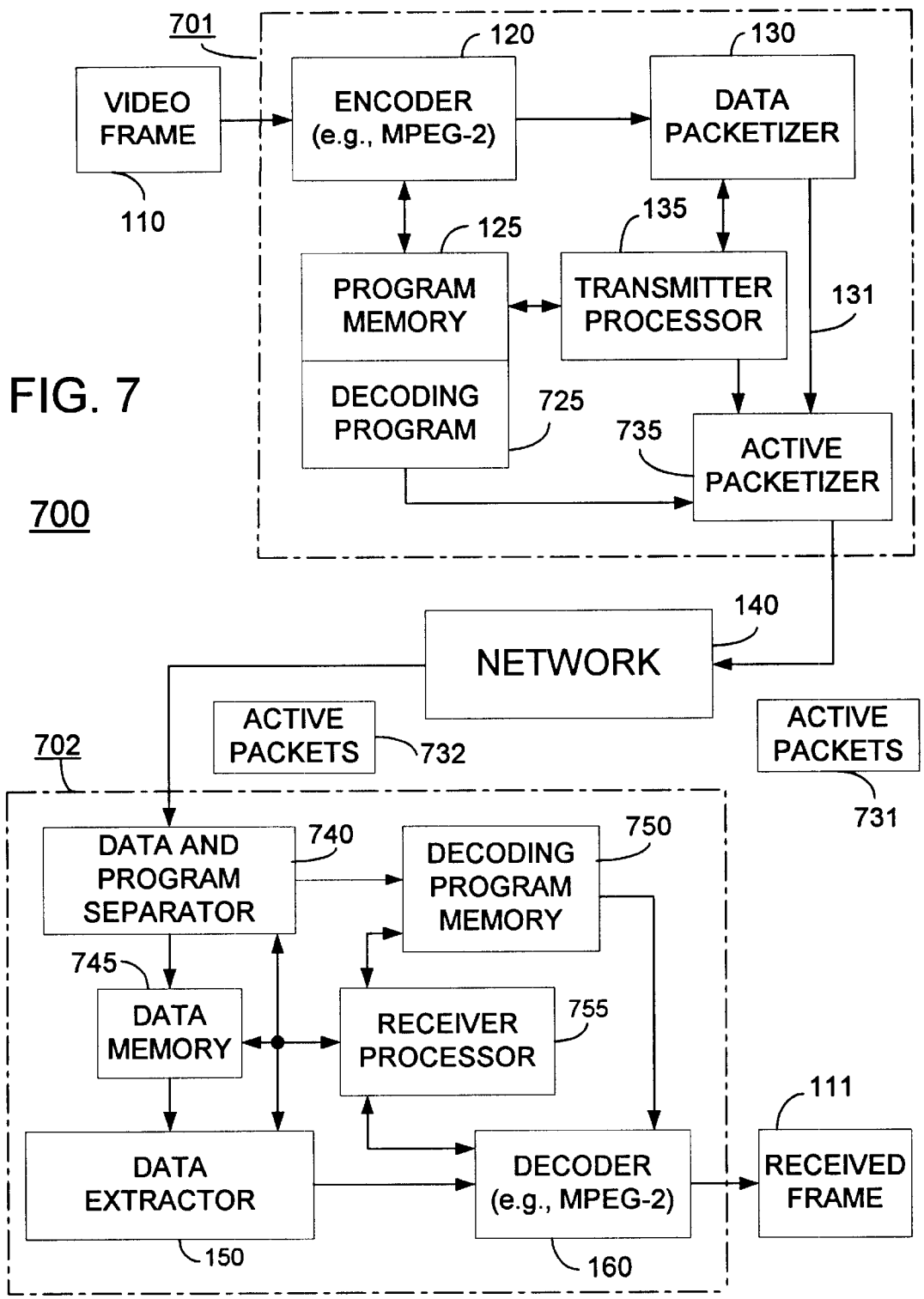
FIG. 7 is a high-level block diagram of an illustrative embodiment of the real-time video system of the present invention.

With reference to FIG. 7, which shows the elements of the present invention overlaid on the conventional system of FIG. 1, transmitter 701 generates and emits active packets for a sequence of video frames, again with frame 110 being exemplary. Receiver 702 only needs to extract the code from the active packets to obtain the appropriate program for decoding the video data stream to produce received frames, with frame 111 being representative of one received frame. Then the video stream can be decoded and displayed using the program instructions that are extracted from the active packets. In this manner, receiver 702 is capable of displaying any type of encoded video stream.

In particular, referring to FIG. 7, system 700 in accordance with the present invention is composed of: (a) transmitter 701; (b) receiver 702; and (c) network 140 interconnecting transmitter 701 and receiver 702.

Transmitter 701 is further composed of: (i) the components of transmitter 101 of FIG. 1, namely, encoder 120, program memory 125, data packetizer 130, and transmitter processor 135; (ii) decoding program 725 augmenting program memory 125; and (iii) "active" packetizer 735, which operates under control of transmitter processor 135. Packets appearing on lead 131 from data packetizer 130 are the same as produced by system 100 of FIG. 1. However, packets 131 now serve as one input to active packetizer 735 rather than being propagated directly by network 140 of FIG. 1; in addition, decoding program 725 provides a second input to active packetizer 735. The output of active packetizer 735 is the stream of active packets 731.

Receiver 702 is composed of: (i) data and program separator 740; (ii) data memory 745 coupled to separator 740; (iii) data extractor 150, as in FIG. 1; (iv) decoding program memory 750, also coupled to separator 740; (v) decoder 160, as in FIG. 1; and (vi) receiver processor 755 which controls the elements of receiver 702. Decoder 160 has as inputs, in addition to processor 755: (a) the data output of data extractor 150, and (b) decoding program software stored in decoding program memory 750.

Transmitter 701

Figure 8:
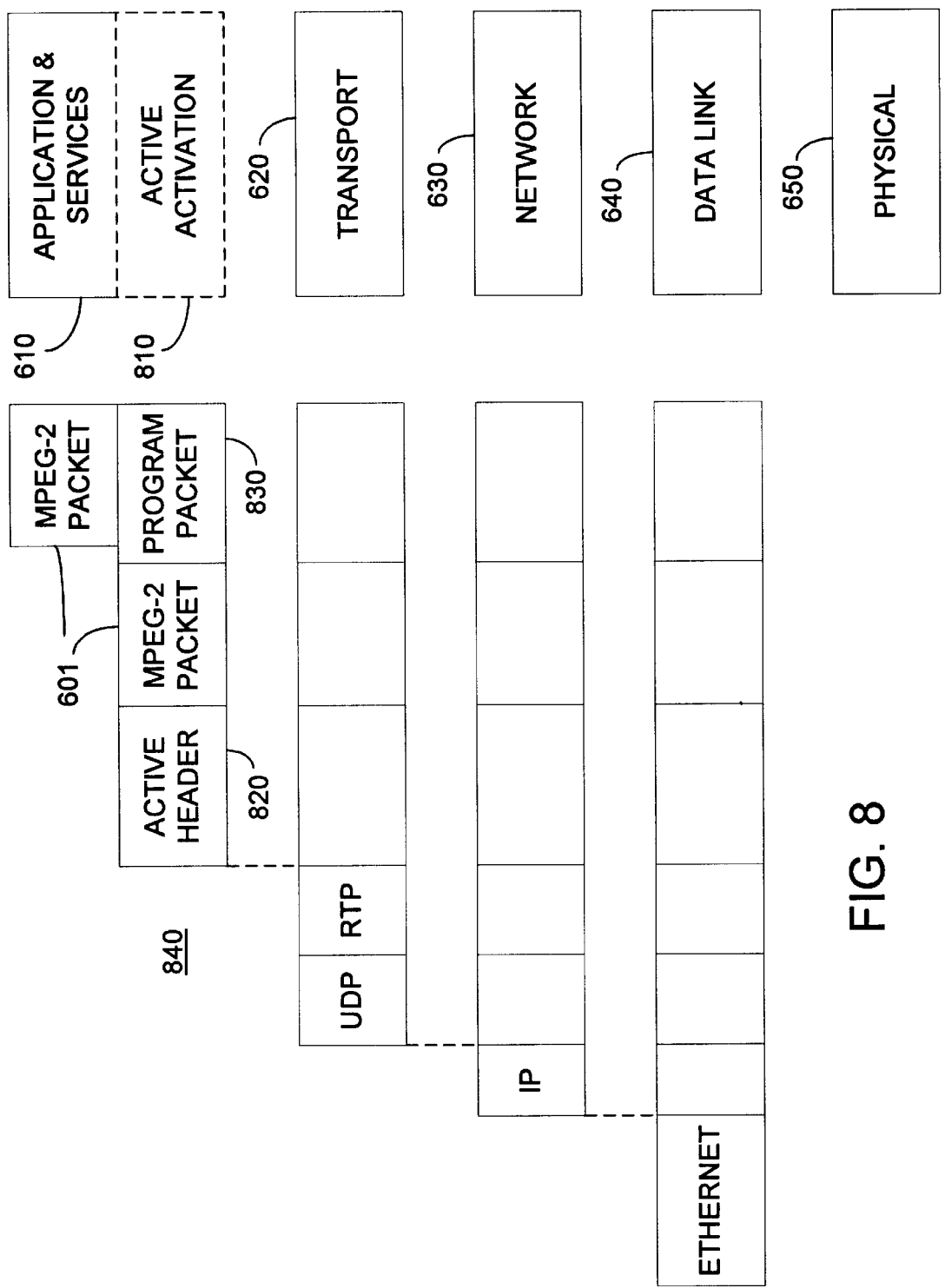
FIG. 8 illustrates the "active activation" as part of the application layer of the conventional protocol stack, this part being used to encapsulate the encoded video frame and bundle the program used to generate the encoded video frame for self-decoding at the receiver.

The process of creating active packets 731 by transmitter 701 is described with reference to FIG. 8, which is a modification of FIG. 6 in accordance with the present invention. In fact, the generation of the protocol stack of FIG. 8 is patterned after the technique by which the protocol stack of FIG. 6 is generated, namely, by adding certain information to the data produced by the next higher level in the stack. Thus. Application and Services layer 610 has appended to it "active activation" sub-layer 810. Activation sub-layer 810 appends certain information to each MPEG-2 packet 601, namely, active header 820 is added before packet 601, and program packet 830 is added after packet 601 to form, in combination, each active packet 840—an exemplary packet in packet stream 731 of FIG. 7.

Figure 9:
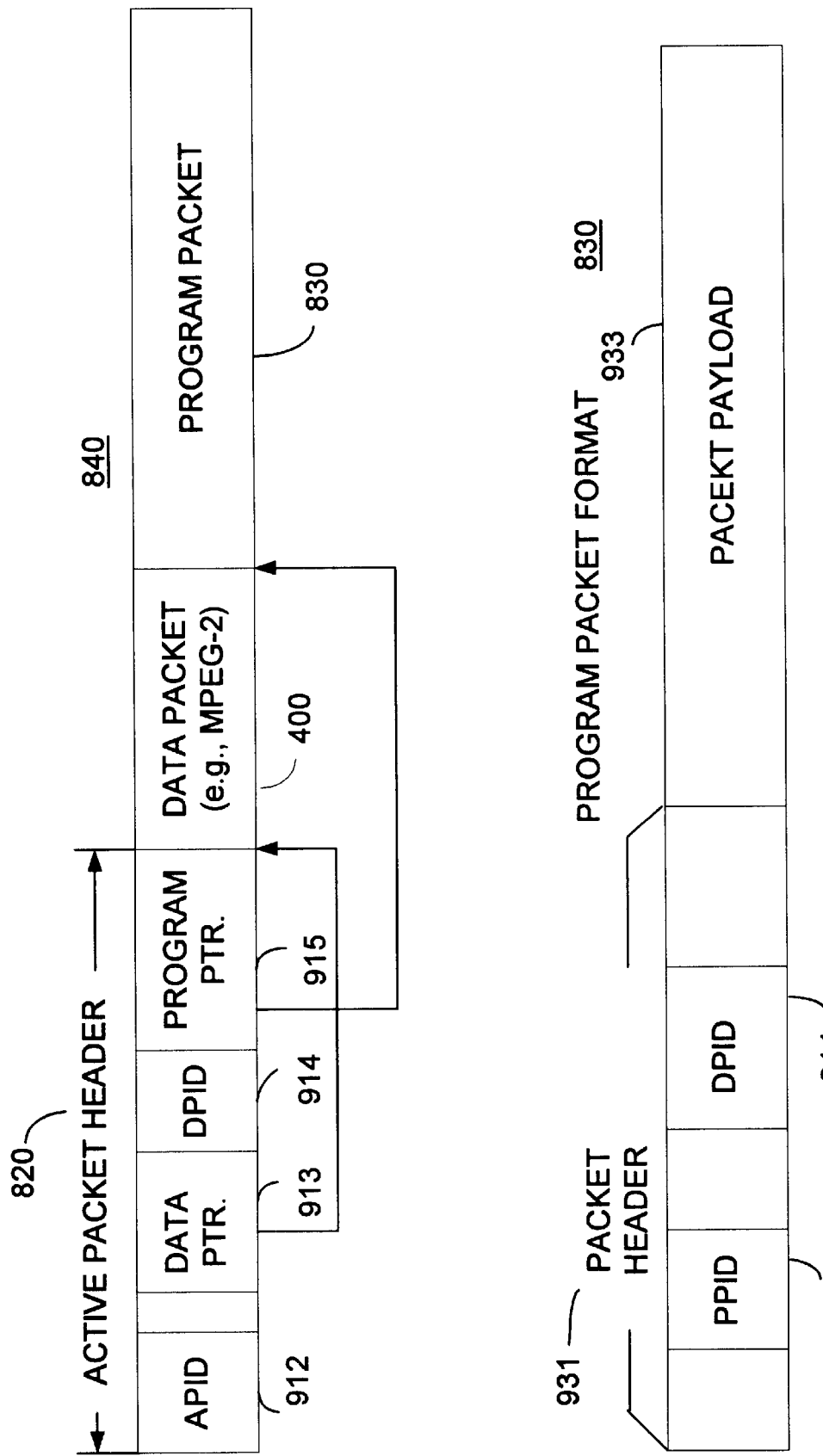
FIG. 9 depicts the contents of an active packet, including the active packet header, the data payload, and the program payload.

The manner in which information is added to packet 601 is shown in more detail in FIG. 9. Active packet header 820 is composed of: (a) active packet identifier (APID) 912; (b) data packet pointer 913, which points to the initial location of data packet 601; (c) data packet identifier (DPID) 914, which identifies the data packet; and (d) program packet pointer 915, which points to the initial location of program packet 830. In turn, the format of program packet 830, as shown in the lower portion of FIG. 9, is composed of packet header 931, which includes DPID 914, and packet payload 933. In particular, payload 933 conveys the decoding program which will be used by receiver 702 to decode the data packet having the associated DPID 914. Thus, DPID 914 serves as the link between data packet 601 and program packet 830 used to decode the data packet.

In MPEG-2 applications, it is usually the case that the program to decode data in an MPEG-2 transport stream is the same from data packet-to-data packet. Thus, the decoding program code need only be sent once, with the first data packet having a given DPID. All other data packets are then assigned the same DPID, and the single decoding program is used to decode successive packets.

On the other hand, in other applications, it may be necessary to send decoding program code with more than the first data packet, so the active packet structure of FIG. 9 is illustrative of the most general case. Also, it may be necessary, because of packet size limitations, to spread the decoding program over a number of active packets, and then re-assemble the decoding programming code from a number of active packets to produce the complete decoding program. In this case, to effect re-assembly, a program packet identifier (PPID), such as PPID 932, will aid in the re-assembly process, that is, segments of a complete program can be assigned and identified by the same PPID to accomplish re-assembly of the complete code.

Active Packet Stream

Figure 10:
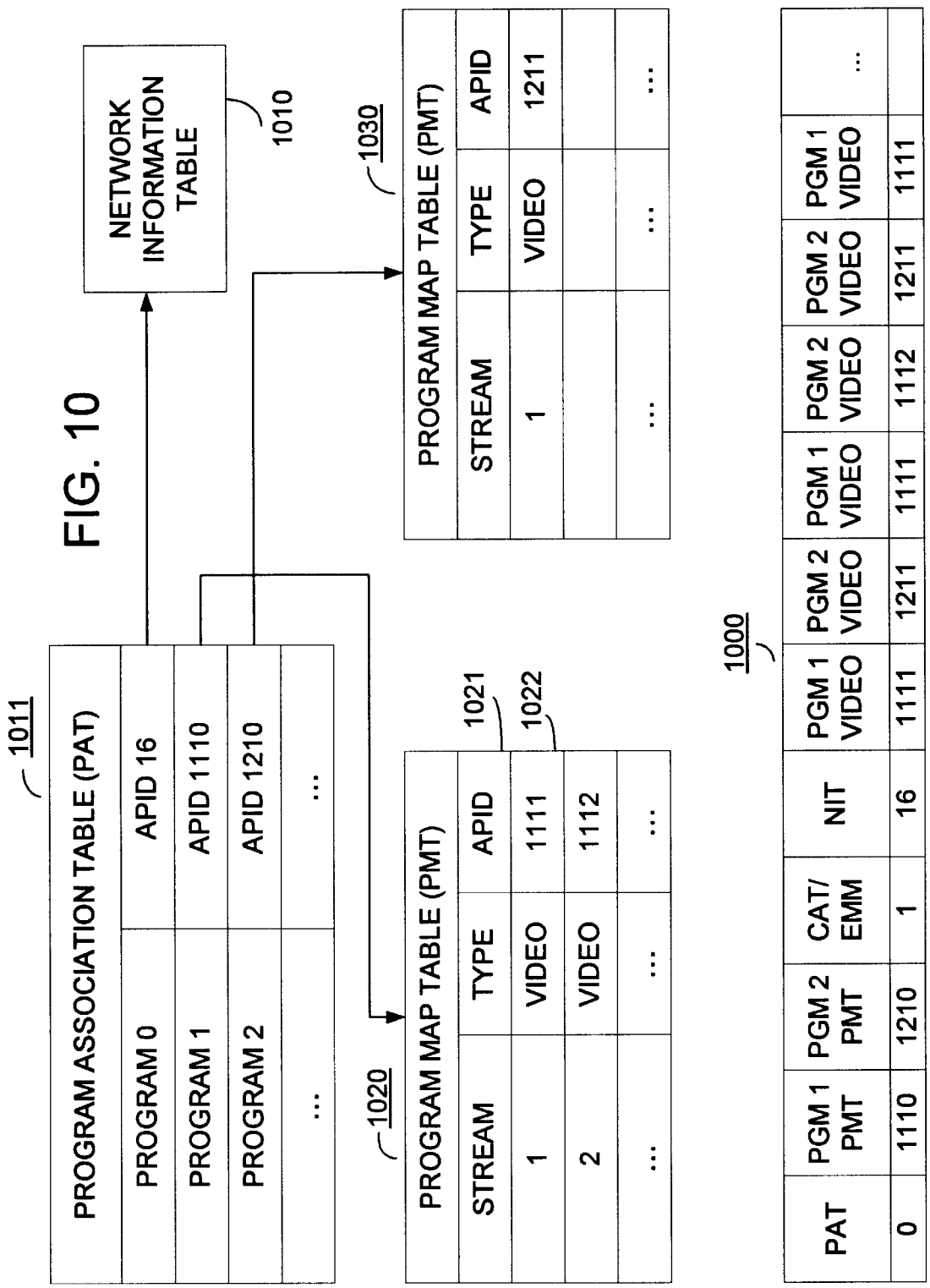
FIG. 10 illustrates the generation of an active packet transport stream in a manner analogous to generation of the transport stream of FIG. 5.

Active Packet Stream 1000 of FIG. 10, which transports active packets 731 of FIG. 7, is formed in a manner analogous to the formation of Transport Stream 400 of FIGS. 4 and 5, that is, the formation of the Active Packet Stream 1000 encapsulates the standard MPEG-2 packets with header and payload information which identifies, as needed, the Program Association Table 1011, the Program Map Tables 1020 and 1030, as well as the APID 1 and APID 16 (CAT/EMM data, and NIT table 1010, respectively) wherein APID is shorthand for Active Packet IDentifier. For example, the first stream associated with PMT 1020 transports a video stream having APID 1111. Each APID is utilized by receiver 702 to compose a video stream originated from the same video source.

Receiver 702

As alluded to above, receiver 702 processes the incoming active packet stream to separate the data payload from the program payload in separator 740. Of course, prior to processing the active packet, processor 740 also removes all headers encapsulating each active packet (e.g., from FIG. 8, the Ethernet, IP, UDP, and RTP headers) to first derive the active packet. The data payload portion of the active packet is stored in data memory 745 in a form illustrated in the top-half of FIG. 11, that is, data memory 745 generally stores the data itself (e.g., '01000101111 . . . ') as well as the associated DPID (e.g., 2111) for the data transported by each data payload. In addition, the program part of the active packet is stored in program memory 750 in a form illustrated in the bottom-half of FIG. 11, that is, program memory 750 generally stores the program itself (e.g., binary of decoding algorithm for data with DPID 2111), as well as the associated DPID and PPID, if necessary (e.g., PPID 2112 associated with DPID 2111). The next two entries in memory 750 are representative of a program that cannot be encompassed by a single program payload, so two program payloads are required, as indicated by the same PPID 2114 for the second and third row entries. The first program payload contains, illustratively, the first part of the binary decoding algorithm for the data with DPID 2113, whereas the second program payload conveys the remainder of the program code for decoding the data with DPID 2113. To convey the fact that the program is split between two payloads, program payload header 931 may incorporate a "flag" indicative of the split program. Thus, it is clear that an active packet may have the following forms: (a) a data payload plus a program payload; (b) a data payload only (whenever the same program is used to decode, and it is sent with the first data payload); and (c) a program payload for programs too large to fit into a single program payload.

Data extractor 150 removes from memory 745, illustratively, only the "raw" data (e.g., '01000101111 . . . ") for processing by decoder 160.

Receiver processor 755 controls the overall processing of receiver 702, and one main function is that of ensuring that the appropriate program to decode a given data payload is completely present in memory 750 before invoking the decoding effected by decoder 160.

Flow Diagrams for Transmitter 701

Figure 12:
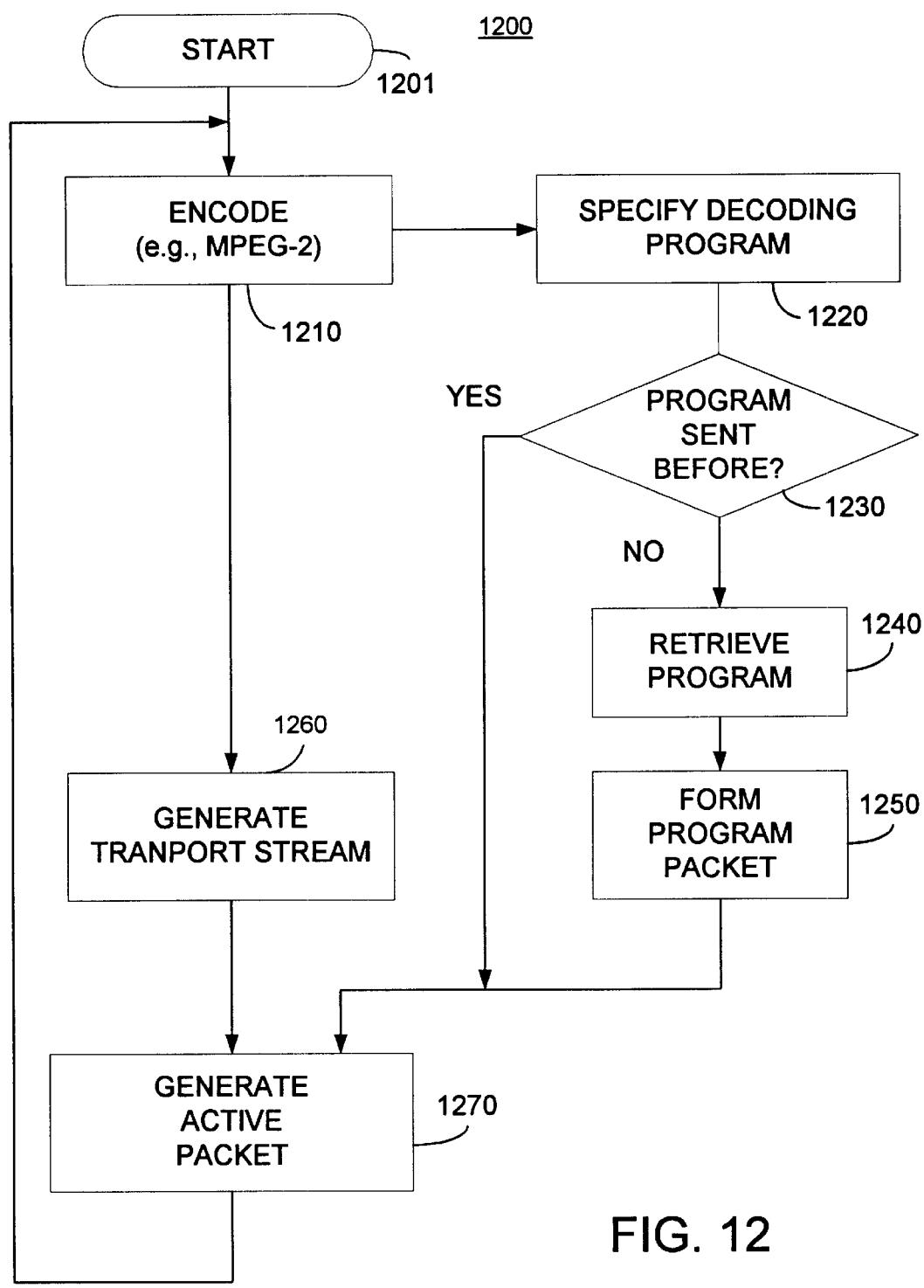
FIG. 12 is a flow diagram for generating an active packet in the transmitter of FIG. 7 in accordance with the present invention.

Flow diagram 1200 of FIG. 12 is representative of high-level processing effected by transmitter 701. With reference to FIG. 12, processing is initiated by processing block 1201. As then invoked by processing block 1210, the incoming real-time video stream is encoded. With every encoding program, there is an associated decoding program, and processing block 1220 is used to specify the decoding program (e.g., if the encoding is accomplished by the Discrete Cosine Transform, the decoding will utilize the Inverse Discrete Cosine Transform). Next, decision block 1230 is tested to determine if the program has already been sent, which may occur if the same decoding program is used for all frames in a given video stream. If the program has not already been sent, then the program is retrieved via processing by block 1240. Once retrieved, the program packet is formed by processing block 1250; the formation includes adding the DPID, PPID, and the "flag" to indicate if the complete program is in this payload. Once the data is encoded by block 1210, then the transport stream is formed by block 1260—illustratively, this is the MPEG-2 transport stream. Finally, as indicated by processing block 1270, the active packet is generated; each active packet is transported as part of active packet stream 1000 as explained above. It is clear that flow diagram is but one illustrative embodiment of the flow carried out by transmitter 701; thus, for instance, encoding by block 1210 and specifying by block 1220 can be completed in parallel.

Flow diagram 1300 of FIG. 13 depicts the details of forming the active packet. In particular, as indicated by processing block 1310, a data packet identifier DPID is assigned to each data packet and a corresponding program packet identifier PPID, if any, is assigned to the program packet. It is necessary to correlate the DPID and PPID, and this step is completed by processing block 1320. Next, as evidenced by processing block 1330, the DPID is entered into the program packet to achieve the coupling between the data payload and program payload necessary to engender decoding at the receiver. Then processing block 1340 is executed to generate the active packet header corresponding to the given data packet and program packet; the header information includes the data and program pointers, if any. Finally, the active packet is formed in processing block 1350 by combining the active packet header, the data packet, and the program packet.

Flow Diagram for Receiver 702

Figure 14:
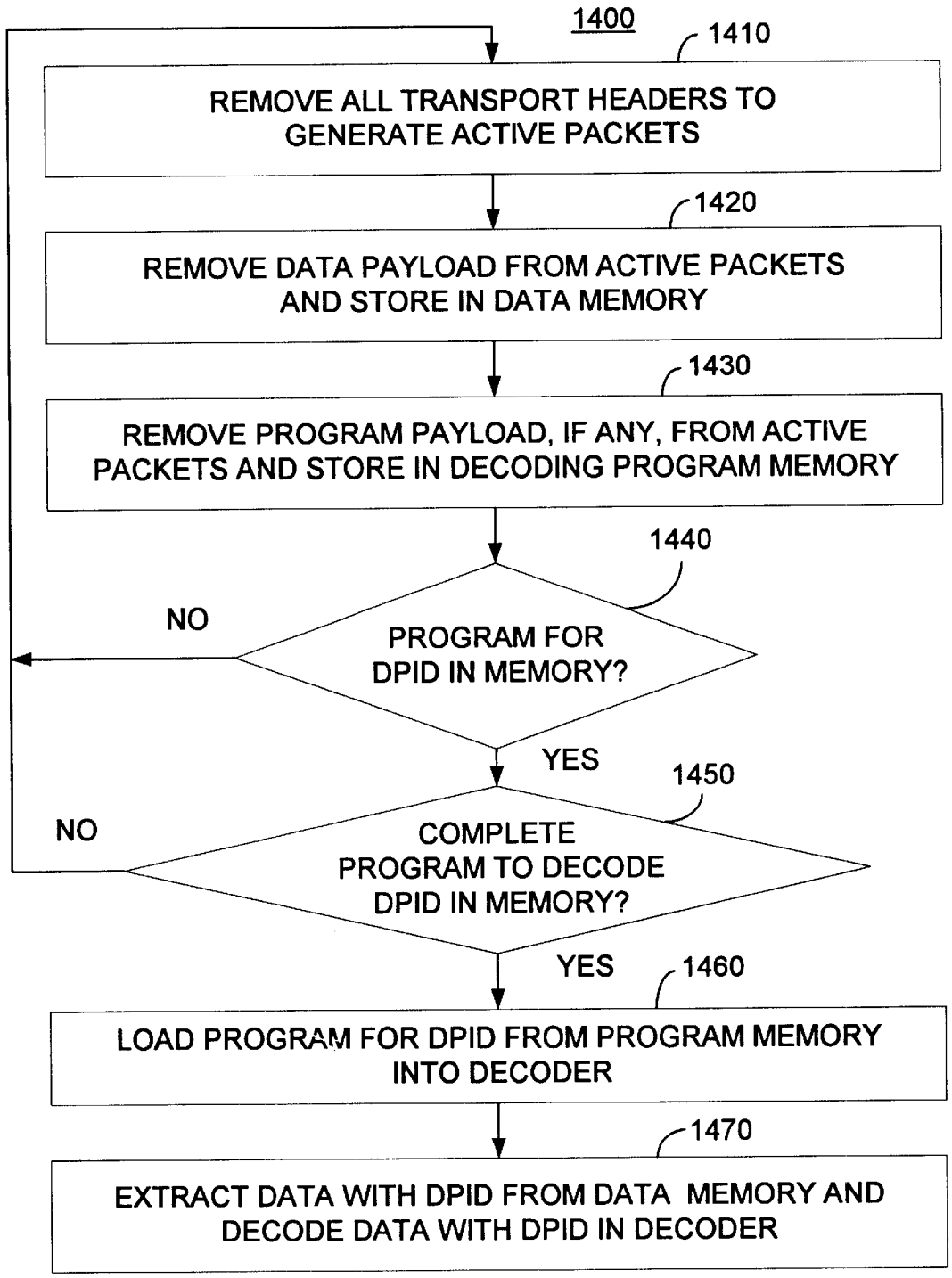
FIG. 14 is a flow diagram for receiving active packets to generate a reproduced version of the input video frame in the receiver of FIG. 7.

Flow diagram 1400 of FIG. 14 is representative of the processing effected by receiver 702 on incoming active packet stream 1000. In particular, processing block 1410 removes all transport headers (such as the Ethernet, IP, UDP, and RTP) as well as the active header information (such as the data packet and program packet pointers). Then processing block 1420 is invoked to remove the data payload for storage in 745. Similarly, the corresponding program payload is removed by processing block 1430, with the resulting program payload being stored in memory 750. Before decoding can commence, processing by decision block 1440 determines if the program for the given DPID is in memory—because of the presentation time stamp may be different than the decode time stamp. It is also necessary to ensure that the complete program is available for decoding, which is the function of decision block 1450. Once the program to decode a given data payload is present, this program is loaded into decoder 160 under control of processor 755, as summarized by processing block 1460. Finally, the associated data corresponding to the decoding program is extracted from data memory 745 by data extractor 150 and this data is decoded in decoder 160.

Generalizations

Whereas the description to this point has focused on the transmission and reception of real-time video, it has been presumed both the encoding of and transporting of the video frame, that is, packetizing of the encoded video, has been explicitly specified so as to transport a sequence of video frames, such as by the MPEG-2 standard. However, there are video codecs (encoder-decoder combinations) whereby only the encoding technique is explicitly specified, and the formation of the propagating stream is determined by the system developer.

In the former case, parameters relating to decoding such as quantizer scale of the device effecting video encoding, motion vectors for related to I, P, and B frames, frame type, and so forth, are explicitly conveyed by header information in the packet.

In the latter case, it is necessary to supply such decoding information with the program payload. Thus, for these cases, system 700 of FIG. 7 is modified as per the following description.

Figure 15:
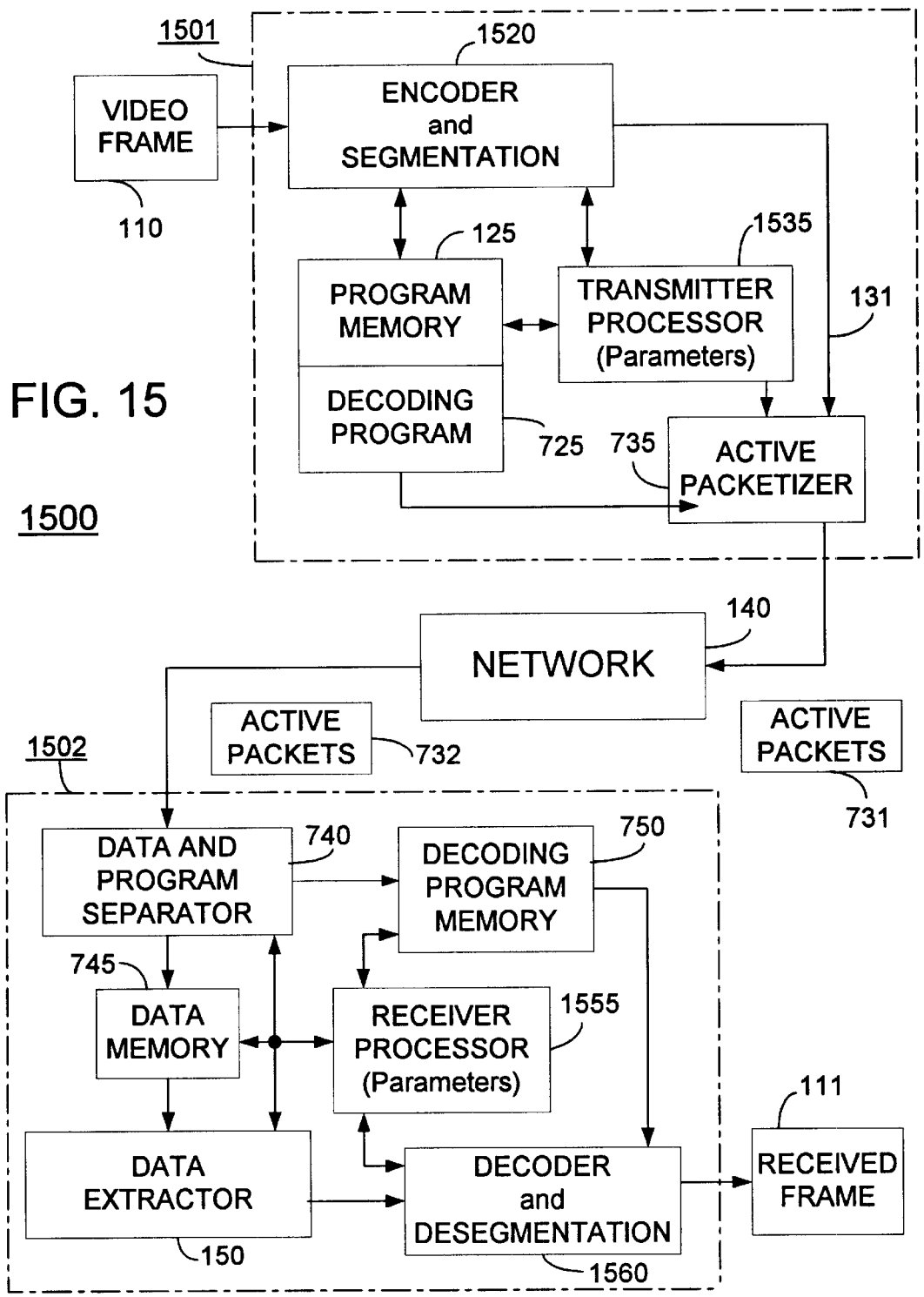
FIG. 15 is a high-level block diagram of another illustrative embodiment of the real-time video system of the present invention.

With reference to FIG. 15, for those video codecs which do not specify how the video data should be transported, packetization (now referred to as segmentation for purposes of distinguishing over the prior inventive aspect) and encoding are combined in the process of generating active packets; this merging of encoding and segmentation is depicted by element 1520 of FIG. 15. As before, each I-frame is divided into blocks according to the setting in the transmitter, that is, a frame is segmented according to the setting of each block. A compression algorithm, for example the Discrete Cosine Transform (DCT), is then applied to these blocks. The program to decompress each block is filled into the program packets. The programs to assemble the program packets and to desegment the data packets along with required decoding parameters are also encapsulated into the program packets; the parameters for encoding and segmentation are managed by transmitter processor 1535, which is essentially identical to transmitter processor 135 of FIG. 7, but in this case processor 1535 explicitly depicts the accessibility of the "parameters" in forming active packets in active packetizer 735. Once again, it may be necessary to only use the same inversion program, for instance IDCT, if all subsequent blocks use the same compression algorithm—then it is only the necessary parameters and coefficients for decompression that have to be injected into the program packets of active packets.

At receiver end in FIG. 15, receiver 1502 operates as follows. As before, the data and program portions of active packets are separated in separator 740. The data packets contain compressed data for each block. The program to decode a block is stored in program memory 750; if the program to decode a block is encapsulated into more than one active packet, the program packets are then compiled by receiver processor 1555 to assemble the complete decoding program which is then stored in program memory 750. Also, the parameters that are detected in the program packets are, for example, managed by receiver processor 1555. Next, decoding and desegmentation is effected by device 1560, that is: the program to decode the block is executed to obtain the restored data of each block, and when all blocks of a frame are collected, the program is executed to desegment or re-group these blocks to generate the original uncompressed frame. This frame is then displayed if this frame has no relationship with preceding or subsequent frames. Otherwise, this frame is stored in memory, which may be part of receiver processor 1555, until all related frames are restored.

Moreover, although there are different approaches for real-time video transmission and reception, the receiver need not have knowledge to differentiate the different techniques performed at the transmitter. Information in the active packets themselves can instruct the receiver how to reconstruct and display the video.

2. Stored Video—Illustrative Embodiment 1

Stored video, or non-real time video, corresponds to a video stream that has been operated on by a video standard to produce a compressed file corresponding to the video stream. Therefore, the encoding/packetizing or encoding/segmentation cannot be performed together, as in the real-time scenarios discussed above, because the compression of the complete video stream has already been effected. Thus, the partitioning of the compressed file to generate the data packets for encapsulation into active packets is performed independent of the compression technique. However, the program for decoding the compressed file at the receiver must be determined first by requiring the transmitter to deduce the encoding algorithm which was used to produce the stored compressed file. These aspects of this illustrative embodiment are summarized by the high-level block diagram of FIG. 16 which depicts overall non-real time video system 1600 as being composed of transmitter 1601 and receiver 1602. In transmitter 1601, encoding deducer 1615 determines the algorithm used to compress stored video 1610. This algorithm has a decoding counterpart which is stored, upon its determination, in decoding program memory 1626 which is, for example, an adjunct to program memory 1625; program memory 1625 contains software for controlling encoding deducer 1615. Parameters determined from the deduction process are managed by transmitter processor 1635. Segmentation device 1620 partitions the stored video data file into data sub-files for transmission as data packets in active packets 731. When the active packets (e.g., packets 731) are assembled by active packetizer 735, the deduced program code used to decode the video data is injected into the program packet portion of the active packets along with the discerned parameters.

At the receiver end, receiver 1602 is essentially the same as receiver 1502 of FIG. 15, with some minor variations in the operation of receiver 1602, as now described. Program information and the data are extracted from the active packets via data and program separator 740, wherein data is stored in data memory 745 and the decoding program is stored in program memory 750. The data is extracted by data extractor 150, and this data is then decoded and desegmented by the processing of element 1660 with reference to the associated program. This results in a reproduced version of the original video stream designated as received video 1611. Receiver processor 1655 provides the overall control of the other components of receiver 1602.

Flow Diagram for System 1600

Figure 17:
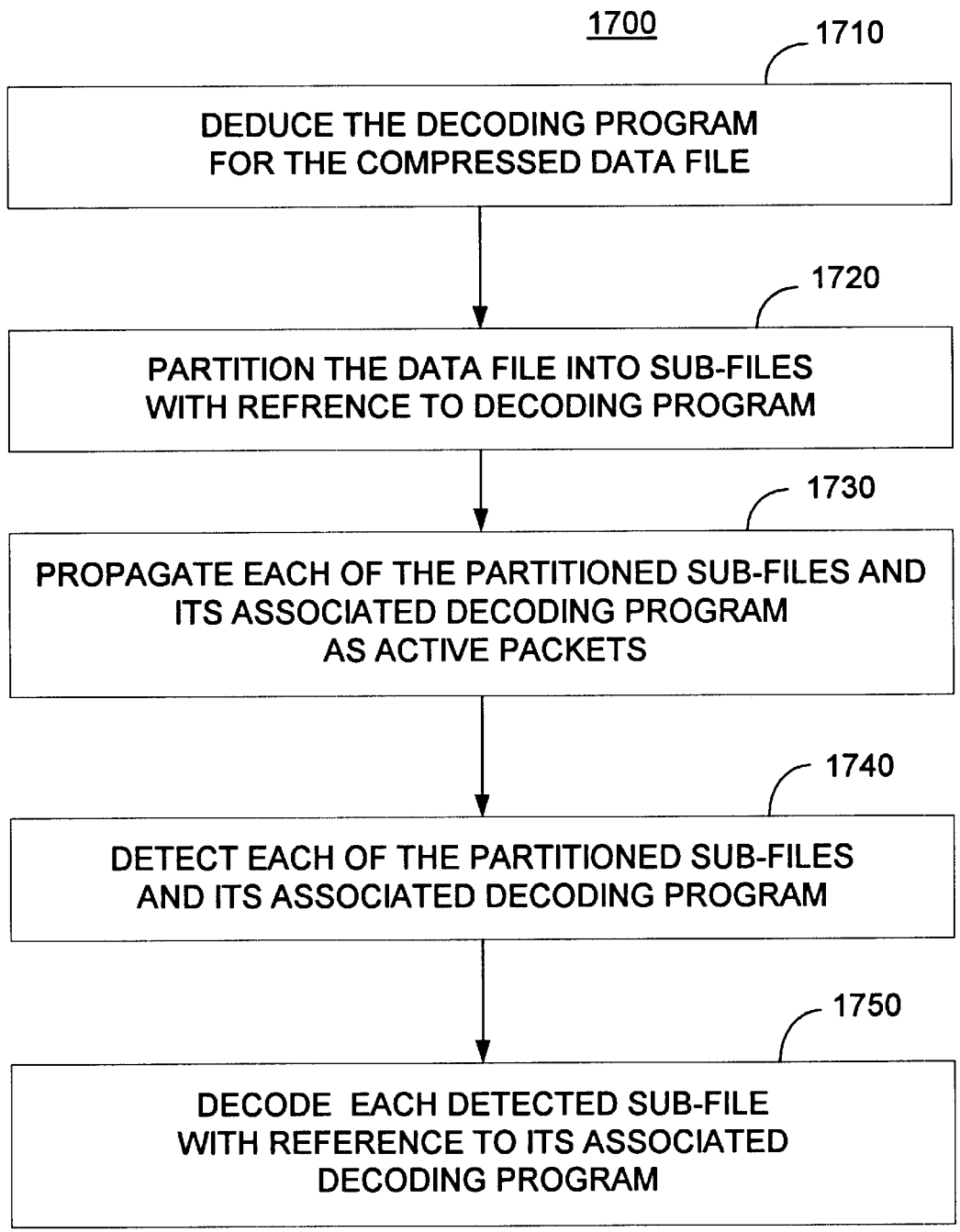
FIG. 17 is a flow diagram for the operation of the system of FIG. 16.

Flow diagram 1700 of FIG. 17 depicts the high-level operation of system 1600. Initially, processing block 1710 is invoked to determine the decoding program which corresponds to the encoding algorithm used to encode the stored compressed data file. Next, as carried out by processing block 1720, the data file is partitioned into sub-files with reference to the deduced decoding program as discerned from the compressed data file. Then, as is evidenced by processing block 1730, each of the sub-files and its associated decoding program its propagated over, for instance, network 140. Processing block 1740 is invoked to detect each of the propagated, partitioned sub-files and its associated decoding program. Finally, processing block 1750 is operated to decode each detected partitioned sub-file with reference to its decoding program.

Figure 16:
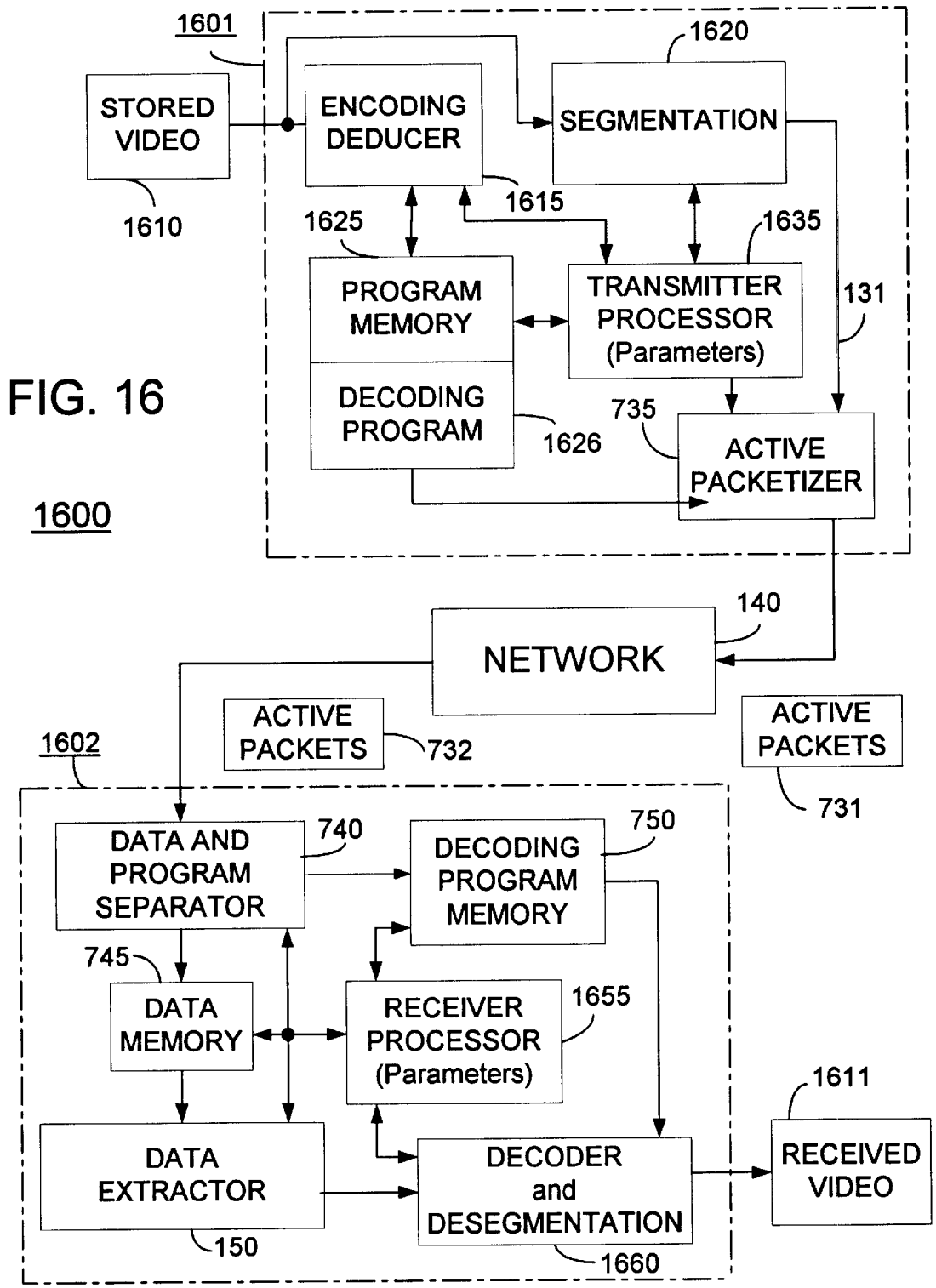
FIG. 16 is a high-level block diagram of an illustrative embodiment of the non-real time video system of the present invention.

The illustrative embodiment of FIG. 16 allows playback of the stored video in receiver 1602 without waiting for the reception of the complete stored video file 1610. However, since the compression of stored video has been performed before the partitioning, that is, segmentation, this technique can suffer from overhead because transmitter 1601 needs to find how each block, MB, and slice in the stored video file 1610 are encoded, and then inject the segmented data with the associated decoding program into the same active packet.

3. Stored Video—Illustrative Embodiment 2

If it is not possible to associate a decoding program with each data sub-file due to complexity or other reasons, it may be necessary to arrange the transmitter to inject program information which is not the decoding program specified for the particular video data portion in the same active packet. The receiver would therefore process the complete sequence of active packets to accumulate all the stored data as well as the complete decoding program so as to reproduce a received version of the original stored compressed data file.

Figure 18:
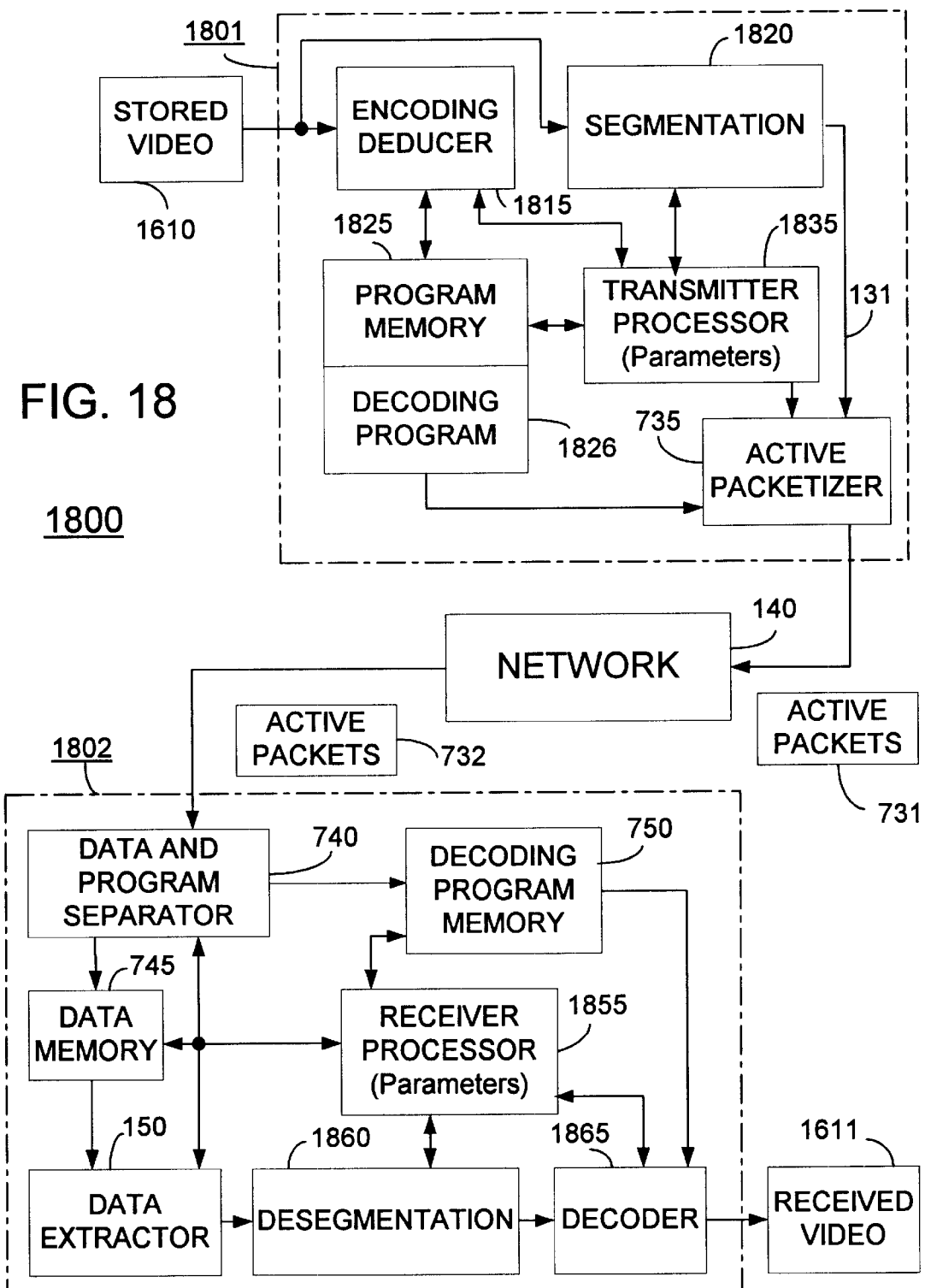
FIG. 18 is a high-level block diagram of another illustrative embodiment of the non-real time video system of the present invention.

With reference to FIG. 18, there is shown system 1800 composed of transmitter 1801 and receiver 1802 which transceives stored compressed file 1610 to a reproduced version 1611 of the original compressed file. In transmitter 1801, encoding deducer 1815 is used to determine the overall encoding program producing compressed file 1610. The encoding program has a decoding counterpart which will be transmitted to receiver 1802 to effect decoding. The deduced decoding program is stored in memory as decoding program 1826; this memory is, for example, part of program memory 1825. Program memory 1825, under control of transmitter processor 1835, stores software used to deduce the encoding algorithm and generate the decoding program. Parameters required for decoding are also deduced while determining the encoding algorithm; such parameters are stored in transmitter processor 1835 for eventual packaging with the program part of the active packets. Segmentation device 1820 partitions the stored video data file into data sub-files for transmission as data packets in active packets 731. Independently of the segmentation process, the decoding program is also partitioned into data sub-programs which become the program portion of the active packets. Active packetizer 735 forms active packets from the independently generated sub-files and sub-programs.

In receiver 1802, data and program separator 740 forwards the data sub-files to data memory 745 and the sub-programs to decoding program memory 750, both under control of receiver processor 1855. Processor 1855 can store the parameters transmitted as part of the program portion of active packets. Once all active packets have been received, the sub-files are extracted from data memory 745 by data extractor 150, and then processed by desegmentation device 1860 to recover a contiguous data file which is a reconstructed version of original data file 1610. The reconstructed version, which is the output of device 1860, is then decoded via decoder 1865 to yield received video 1611, which corresponds to the original video stream which was encoded to obtain stored video file 1610. Since this is not a real-time application, the delay caused by waiting for the complete transmission of the stored data file should be acceptable.

Flow Diagram for System 1800

Figure 19:
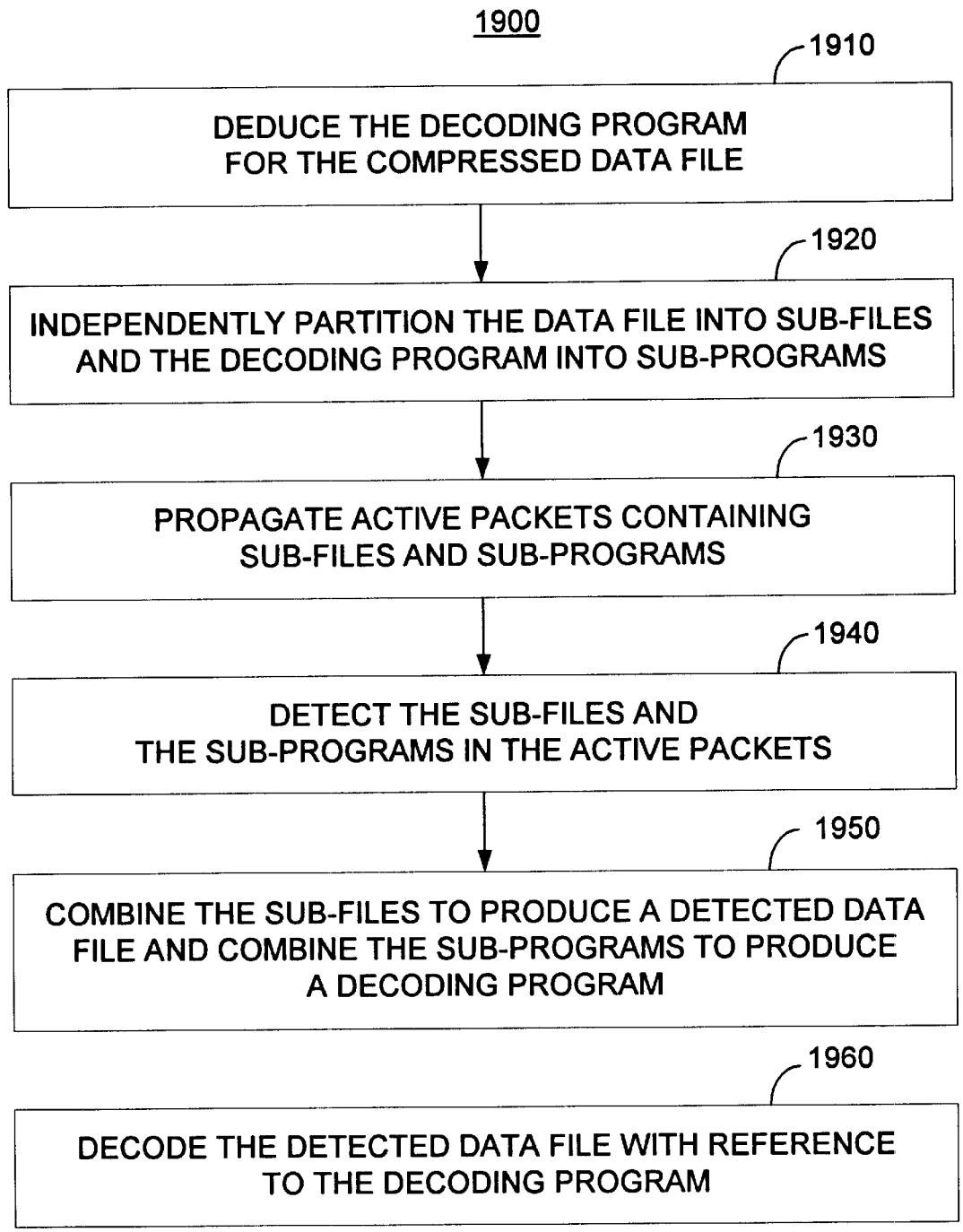
FIG. 19 is a flow diagram for the operation of the system of FIG. 18.

Flow diagram 1900 of FIG. 19 depicts the high-level operation of system 1800. Initially, processing block 1910 is invoked to determine the decoding program which corresponds to the encoding algorithm used to encode the stored compressed data file. Next, as carried out by processing block 1920, the data file and the decoding program are, independently, partitioned into sub-files and sub-programs. Then, as is evidenced by processing block 1930, the sub-files and the sub-programs are used for forming active packets, and the active packets are propagated, for instance, over network 140. Processing block 1940 is invoked to detect the sub-files and the sub-programs. Once all of the active packets are received, then processing block 1950 is executed to combine the sub-files into a desegmented detected data file and to combine the sub-programs into a decoding program. Finally, processing block 1960 is operated to decode the detected data file with reference to the decoding program.

Although there are different approaches for real-time and stored video, the receiver does not need to have the knowledge to differentiate the different schemes performed in the transmitter. The active packets can instruct the receiver how to reconstruct and playback the video.

In addition, although the active technique disclosed herein has the advantage of playing back any type of video without specific decoders, the embedding of program information into active packets increases packet size and increases the network traffic load. However, most of the overhead of video coding is on the encoding rather than decoding. The following techniques can be used to reduce the packet size and traffic load.

The coding of video can be done in hardware, and custom hardware is available for the implementation of video coding. Some VLSI chips have been designed specially for DCT, motion estimation, or entropy coding which can be used as an auxiliary for video codecs. For those receivers equipped with these chips, they can inform the transmitters that the programs for these computations are not necessary. The transmitters, therefore, embed only the parameters used for these computations rather than the actual program code into the active packets. This reduces the packet size significantly.

Hardware implementation of video coding standards has also recently become available. This hardware may be dedicated coders or programmable video signal processors. Dedicated coders provide limited programmability and have architecture or control logic for a specific video coding standard. Programmable processors, however, offer much more flexibility in code design and implementation although they require larger silicon area and dissipate more power than dedicated processors. This bundling of program information with video data can be initiated by the receiver. Therefore when a receiver requests a video file or stream that is encoded by a standard that the receiver already supports in hardware or loaded software, the receiver can instruct the sender to not include program information. This will reduced unnecessary transmission of decoding information.

The second method to reduce the packet size and traffic load can be done by caching. The programs for DCT, motion estimation, entropy coding, or even the specific video codecs can be cached in the receivers or a proxy. Similar to the hardware implementation described above, the receiver can inform transmitter that part or all of the decoding programs are not required if the programs have been cached. Thus, packet size can be reduced as well.

Although various embodiments which incorporate the teachings of the present invention have been shown and described in detail herein, those skilled in the art can readily devise many other varied embodiments that still incorporate these teachings.

What is claimed is:

1. A method for transceiving incoming data to allow the use of any encoding format without requiring decoding program for that format to be priorly present at a receiver, said method comprising the steps of encoding the data with an encoding program to produce encoded data, propagating an active packet composed of the encoded data and executable code comprising a decoding program corresponding to the encoding program, detecting and separating the executable code of the decoding program and the encoded data at the receiver; and decoding the detected encoded data using the propagated executable code of the detected decoding program to produce a version of the incoming data, said decoding including processing the propagated executable code to create the decoding program and loading the created decoding program into a decoder.

2. The method as recited in claim 1 wherein the step of propagating an active packet includes the step of adding a header to the encoded data and its corresponding decoding program, the header including a data program identifier for associating the encoded data with its associated decoding program, and the step of detecting includes the step of detecting the data program identifier and the step of decoding includes the step of associating the detected encoded data with its decoding program with reference to the program identifier.

3. The method as recited in claim 1 wherein said separating step comprises storing the detected encoded data in a data memory and storing the detected executable code of the decoding program in a decoding program memory.

4. The method as recited in claim 3 wherein said decoding step includes compiling the propagated executable code of the detected decoding program at the receiver.

5. A method for transceiving a video frame to a receiver without requiring the receiver to have decoding capabilities for any specific encoding format, said method comprising the steps of encoding the video frame with an encoding program to produce an encoded frame;

propagating from a transmitter an active data stream composed of the encoded frame and executable code comprising a decoding program corresponding to the encoding program, detecting and separating at the receiver the decoding program and the encoded frame in the data stream, and decoding the detected encoded frame with the propagated executable code of the detected decoding program to produce a received version of the video frame, said decoding including compiling said executable code of the detected decoding program.

6. The method as recited in claim 3 wherein the step of propagating an active packet includes the step of adding a header to the encoded frame and its associated decoding program, the heading including a data program identifier for associating the encoded frame with its associated decoding program, and the step of detecting includes the step of detecting the data program identifier and the step of decoding includes the step of associating the detected encoded frame with its decoding program with reference to the data program identifier.

7. A method for transmitting a real-time video-stream composed of frames, the method comprising the steps of encoding each of the frames with an encoding program to produce a set of encoded frames, generating a plurality of active data streams each composed of encoded frames and an associated executable code comprising a decoding program corresponding to the encoding program, the decoding program for at least one of said frames in one of said data streams being different than the decoding program for another of said frames in said one data stream, propagating from a transmitter the one active data stream over a path, detecting and separating at a receiver each of the encoded frames and the executable code of the associated decoding program in the one data stream, the executable code having been propagated to the receiver from the transmitter, and decoding each of the frames with its associated decoding program to produce a sequence of received frames representative of the real-time video stream.

8. The method as recited in claim 7 wherein the step of generating includes the steps of forming active packets such that each of the packets includes one of the encoded frames and its associated decoding program, and interleaving the active data packets to form the data stream.

9. The method as recited in claim 8 wherein the step of forming packets includes the step of adding a header to each of the encoded data frames and its associated decoding program, the header including a data program identifier for associating each encoded data frame with its associated decoding program, the step of detecting includes the step of detecting the data program identifier and the step of decoding includes the step of associating the detected encoded frame with its decoding program with reference to the data program identifier.

10. A method for transmitting a real-time video stream, the method comprising the steps of encoding and compressing the video stream with an encoding program to produce a compressed encoded data stream, generating an active data stream composed of the compressed encoded data stream and executable code comprising a decoding program corresponding to the encoding program, propagating from a transmitter the active data stream over a path, detecting and separating at a receiver the decoding program and the compressed encoded data stream in the active data stream, determining the appropriate decompression algorithm and decompressing the compressed encoded data stream, separately storing the decoding program and the decompressed encoded data stream, and decoding the decompressed data stream with the propagated executable code of the decoding program to produce the real-time video stream.

11. The method as recited in claim 10 wherein the step of generating includes the steps of partitioning the encoded data stream into a plurality of subsets, and associating a decoding program with each of the subsets.

12. Circuitry for transceiving a video frame over a path comprising a transmitter including an encoder for encoding the video frame with an encoding program to produce an encoded frame, and means, responsive to the encoder, for propagating onto the path an active data stream composed of the encoded frame and executable code comprising a decoding program corresponding to the encoded program, and a receiver including a detector, coupled to the path, for detecting the propagated executable code of the decoding program and the encoded frame in the active data stream, a data memory for storing the encoded frame in the active data stream, a decoding program memory for storing the propagated executable code of the decoding program, and a decoder, responsive to the detector and said data and decoding program memories, for decoding the detected encoded frame with the detected propagated executable code of the decoding program to produce a received version of the video frame.

13. A method for transmitting data from a transmitter in a format to a receiver which does not include program capability for decoding the transmitted format, said method comprising the steps of at the transmitter, encoding the data with an encoding program to produce encoded data and propagating an active packet composed of the encoded data and executable code comprising a decoding program corresponding to the encoding program, and at the receiver, detecting the executable code of the decoding program and the encoded data, loading the detected decoding program into a decoder, and the decoder decoding the detected encoded data using the propagated executable code of the detected decoding program which had been propagated from the transmitter to produce a version of the data at the receiver.

14. The method as recited in claim 13 further comprising at the receiver storing the decoding program in a decoding program memory prior to the step of loading the detected decoding program into a decoder.

15. The method as recited in claim 14 further comprising storing the detected encoded data in a data memory at the receiver prior to the decoding step.

16. The method as recited in claim 14 further comprising compiling the detected executable code of the decoding program at the receiver.

17. The method as recited in claim 13 wherein said encoded data comprises a plurality of frames, each of said frames having an associated decoding program, the decoding program for at least one of said frames being different than the decoding program for another of said frames in said encoded data.

* * * * *